(12) United States Patent
Hasselgren et al.

(10) Patent No.: US 10,269,326 B2
(45) Date of Patent: Apr. 23, 2019

(54) METHOD AND APPARATUS FOR COLOR BUFFER COMPRESSION

(71) Applicant: Intel Corporation, Santa Clara, CA (US)

(72) Inventors: Jon N. Hasselgren, Bunkeflostrand (SE); Carl J. Munkberg, Malmö (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/975,750

(22) Filed: Dec. 19, 2015

(65) Prior Publication Data

US 2017/0178594 A1    Jun. 22, 2017

(51) Int. Cl.

| | |
|---|---|
| *G09G 5/02* | (2006.01) |
| *G09G 5/06* | (2006.01) |
| *H04N 19/124* | (2014.01) |
| *H04N 19/136* | (2014.01) |
| *H04N 19/167* | (2014.01) |
| *H04N 19/17* | (2014.01) |
| *H04N 19/184* | (2014.01) |
| *H04N 19/186* | (2014.01) |
| *H04N 19/426* | (2014.01) |

(Continued)

(52) U.S. Cl.
CPC ............. *G09G 5/06* (2013.01); *G06T 7/408* (2013.01); *H04N 1/644* (2013.01); *H04N 19/124* (2014.11); *H04N 19/136* (2014.11); *H04N 19/167* (2014.11); *H04N 19/17* (2014.11); *H04N 19/174* (2014.11); *H04N 19/184* (2014.11); *H04N 19/186* (2014.11); *H04N 19/426* (2014.11)

(58) Field of Classification Search
CPC . G09G 5/02; G09G 5/06; G09G 5/363; G06T 11/001; G06F 3/04845
USPC ........................................................ 345/591
See application file for complete search history.

(56) References Cited

U.S. PATENT DOCUMENTS

| | | | | |
|---|---|---|---|---|
| 5,544,284 A | * | 8/1996 | Allebach ................ | H04N 1/644 345/603 |
| 6,411,730 B1 | * | 6/2002 | Bartell .................. | H04N 1/644 358/522 |

(Continued)

FOREIGN PATENT DOCUMENTS

| | | |
|---|---|---|
| WO | 2009/093947 A1 | 7/2009 |
| WO | 2015-096812 A1 | 7/2015 |

OTHER PUBLICATIONS

"Color Image Quantization by Minimizing the Maximum Intercluster Distance" (Zhigang Xiang, The City University of New York, Queens College, NY, ACM Transactions on Graphics, vol. 16, No. 3, Jul. 1997).*

(Continued)

*Primary Examiner* — Gordon G Liu
(74) *Attorney, Agent, or Firm* — Nicholson De Vos Webster & Elliott LLP

(57) ABSTRACT

An apparatus and method for color buffer compression. For example, one embodiment of a method comprises: specifying a palette of available colors within a color space to be used for quantizing color values of pixels within a tile; subdividing the color space into a plurality of axis-aligned bucket regions, each of the available colors falling within one of the bucket regions; and quantizing the color values based on both the palette of available colors and the axis-aligned bucket regions.

18 Claims, 28 Drawing Sheets

(51) Int. Cl.
*G06T 7/40* (2017.01)
*H04N 1/64* (2006.01)
*H04N 19/174* (2014.01)

(56) References Cited

U.S. PATENT DOCUMENTS

| | | |
|---|---|---|
| 2001/0005426 A1 | 6/2001 | Song et al. |
| 2004/0151372 A1 | 8/2004 | Reshetov et al. |
| 2005/0185000 A1* | 8/2005 | Nonaka ................. G06T 11/001 345/590 |
| 2006/0083432 A1 | 4/2006 | Malvar |
| 2010/0067790 A1 | 3/2010 | Yamamoto |
| 2010/0142813 A1 | 6/2010 | Abdo |
| 2015/0062139 A1 | 3/2015 | Akenine-Moller et al. |

OTHER PUBLICATIONS

MATLAB, "Reduce the Number of Colors in an Image" 2012 [Online] [Retrieved on Jun. 28, 2017] Retrieved from the Internet <https://www.mathworks.com/help/images/reduce-the-number-of-colors-in-an-image.html>.*

International Search Report and Written Opinion for Application No. PCT/US2016/062415, dated Feb. 28, 2017, 14 pages.

Jim Rasmusson et al., "Exact and Error-bounded Approximate Color Buffer Compression and Decompression", Graphics Hardware '07, Proceedings of the 22nd ACM SIGGRAPH/EUROGRAPHICS symposium on Graphics hardware, Aug. 4-5, 2007, pp. 41-48.

ATI Technologies Inc., "3Dc™ White Paper" developed by ATI and introduced in the new RADEON X800 series, 7 pages.

Extended European Search Report for Application No. 14180463.3, dated Oct. 29, 2014, 8 pages.

Munkberg J., et al., "High Dynamic Range Texture Compression for Graphics Hardware," ACM Transactions on Graphics (TOG), 2006, vol. 24 (3), 10 pages.

Non-Final Office Action from U.S. Appl. No. 14/012,048, dated Dec. 10, 2015, 25 pages.

Final Office Action from U.S. Appl. No. 14/012,048, dated Jul. 8, 2016, 15 pages.

Notice of Allowance from U.S. Appl. No. 14/012,048, dated Nov. 17, 2016, 8 pages.

International Preliminary Report on Patentability for Application No. PCT/US2016/062415, dated Jun. 28, 2018, 10 pages.

* cited by examiner

FIG. 9A  GRAPHICS PROCESSOR COMMAND FORMAT
900
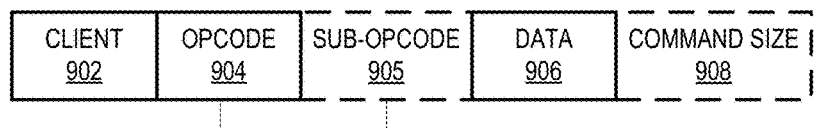
FIG. 9B  GRAPHICS PROCESSOR COMMAND SEQUENCE
910
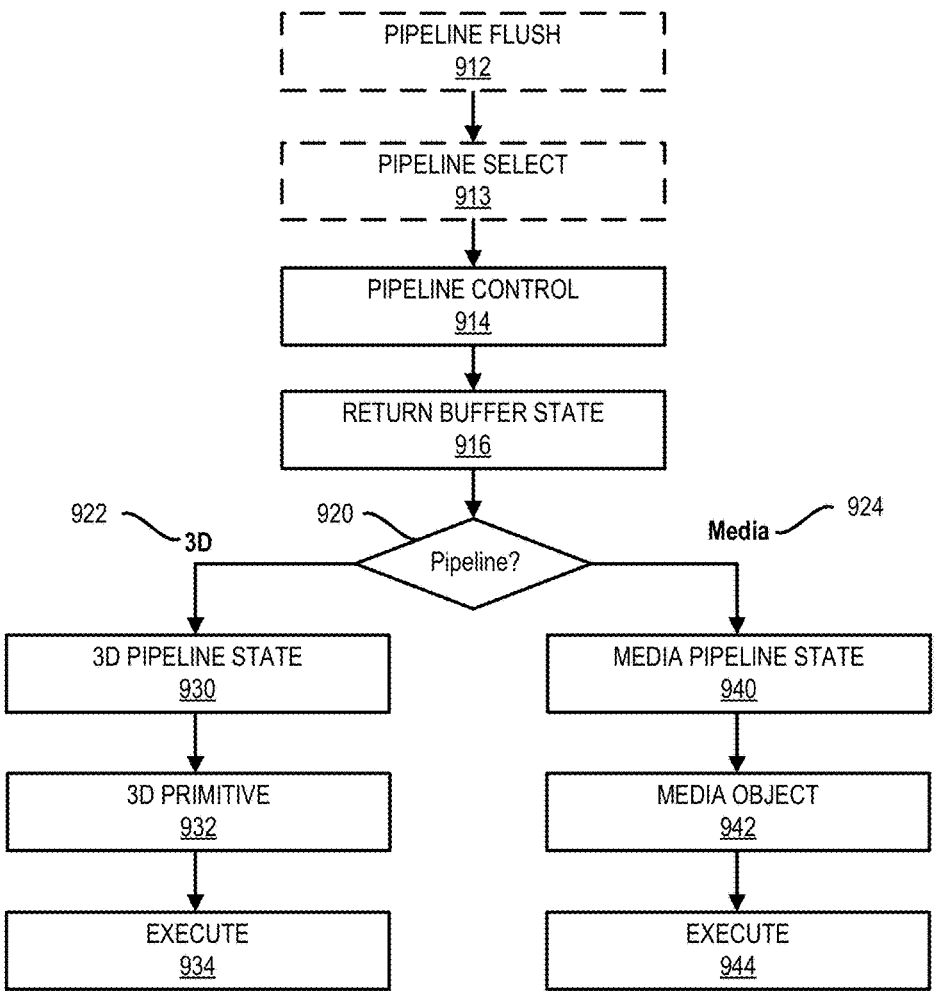

| Color Value | Y sub-value | Y available | Y EIV | Cg sub-value | Cg available | Cg EIV |
|---|---|---|---|---|---|---|
| cv1 | 32 | 32 | 000 | -32 | -32 | 00 |
| cv2 | 84 | 78 | 010 | -20 | -32 | 00 |
| cv3 | 97 | 101 | 011 | -32 | -32 | 00 |
| cv4 | 106 | 101 | 011 | 26 | 32 | 10 |
| cv5 | 140 | 147 | 101 | 64 | 64 | 11 |
| cv6 | 153 | 147 | 101 | 40 | 32 | 10 |
| cv7 | 162 | 170 | 110 | 64 | 64 | 11 |
| cv8 | 192 | 192 | 111 | 64 | 64 | 11 |

```
┌─────────────────────────────────────┐
│ Determine Color Values Associated With Pixels │
│                                     │
│              2102                   │
└─────────────────────────────────────┘
                  │
                  ▼
┌─────────────────────────────────────┐
│ Determine a Bounding Box with Bounding Range(s) │
│                                     │
│              2104                   │
└─────────────────────────────────────┘
                  │
                  ▼
┌─────────────────────────────────────┐
│ Quantize the Bounding Range(s) to generate Set(s) of Available Values │
│                                     │
│              2106                   │
└─────────────────────────────────────┘
                  │
                  ▼
┌─────────────────────────────────────┐
│ Associate the Set(s) of Available Values with Set(s) of Index Values │
│                                     │
│              2108                   │
└─────────────────────────────────────┘
                  │
                  ▼
┌─────────────────────────────────────┐
│ Encode Sub-Values of Color Values by associating Sub-Values with Index Values │
│                                     │
│              2110                   │
└─────────────────────────────────────┘
                  │
                  ▼
┌─────────────────────────────────────┐
│ Store Graphics Data Including Encoded Index Values and Data Associated with Bounding Box │
│                                     │
│              2112                   │
└─────────────────────────────────────┘
```

Access Graphics Data

2402

Determine a Set of Available Values based on the Graphics Data

2404

Determine Decoded Color Values for Pixels based on Encoded Index Values in the Graphics Data

2406

Map Decoded Color Values to another Color Space

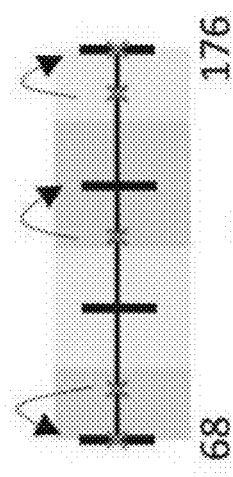
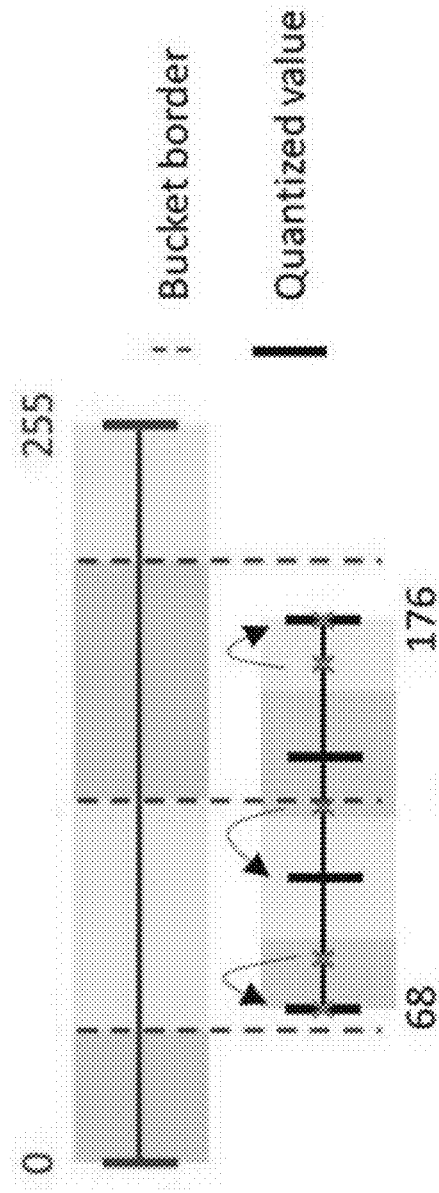
FIG. 28A
FIG. 28B

METHOD AND APPARATUS FOR COLOR BUFFER COMPRESSION

BACKGROUND

Field of the Invention

This invention relates generally to the field of computer processors. More particularly, the invention relates to an apparatus and method for color buffer compression.

Description of the Related Art

In general, graphics rendering may generate an image or images from model data using a wide range of computer implemented techniques. In some implementations, the color buffer may be the largest bandwidth consumer in the graphics pipeline and system performance may be enhanced by color compression techniques.

The aim of such compression techniques, in general, may be to achieve a bit budget. For example, memory bandwidth may be associated with a limit or a specific cache line size or the like that may provide limits (e.g., 512 bits per cache line or the like) for memory transactions. If a compression technique may transmit or store data less than or equal to the limit, the number of transactions associated with the data may be reduced saving power and increasing performance. Therefore, if color data may be compressed to meet the bit budget, the compression may be considered successful and the data may be stored as compressed. If the bit budget is not met, the compression may have failed and the data may be stored uncompressed since the compression would not save on memory transactions or the like. The greater rate at which a compression technique achieves successful compression of data (i.e., meets a desired bit budget), the greater the system performance will be enhanced.

Commonly, color data may be compressed using lossless compression techniques such that the color data is encoded without quality loss. Using lossless techniques may limit attainable compression rates and the rate of successful compressions may be limited. If, however, minor losses of quality are acceptable, greater compression rates may be attained using lossy compression techniques, which may provide more successful attempts at compression and may save memory bandwidth. Such bandwidth savings may increase performance and/or reduce power consumption in various devices.

BRIEF DESCRIPTION OF THE DRAWINGS

A better understanding of the present invention can be obtained from the following detailed description in conjunction with the following drawings, in which:

FIG. 9A is a block diagram illustrating a graphics processor command format according to an embodiment;

FIG. 9B is a block diagram illustrating a graphics processor command sequence according to an embodiment;

FIG. 19 is an illustrative diagram of example encoded index values corresponding to example color values;

FIG. 21 is a flow chart illustrating an example process;

FIG. 24 is a flow chart illustrating an example process;

FIGS. 28A-B illustrate one embodiment of the invention in which color palettes are arranged within buckets.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
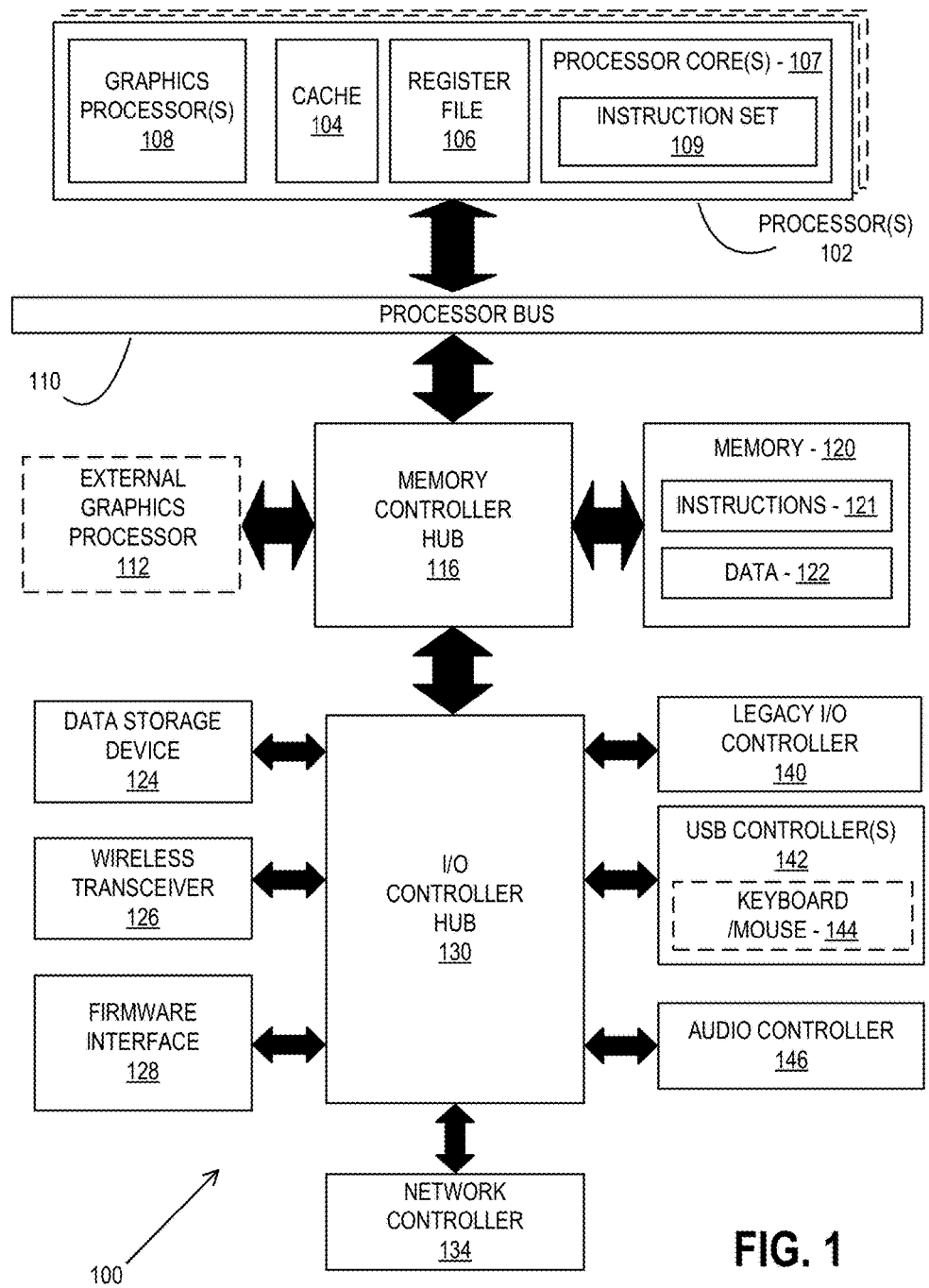
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
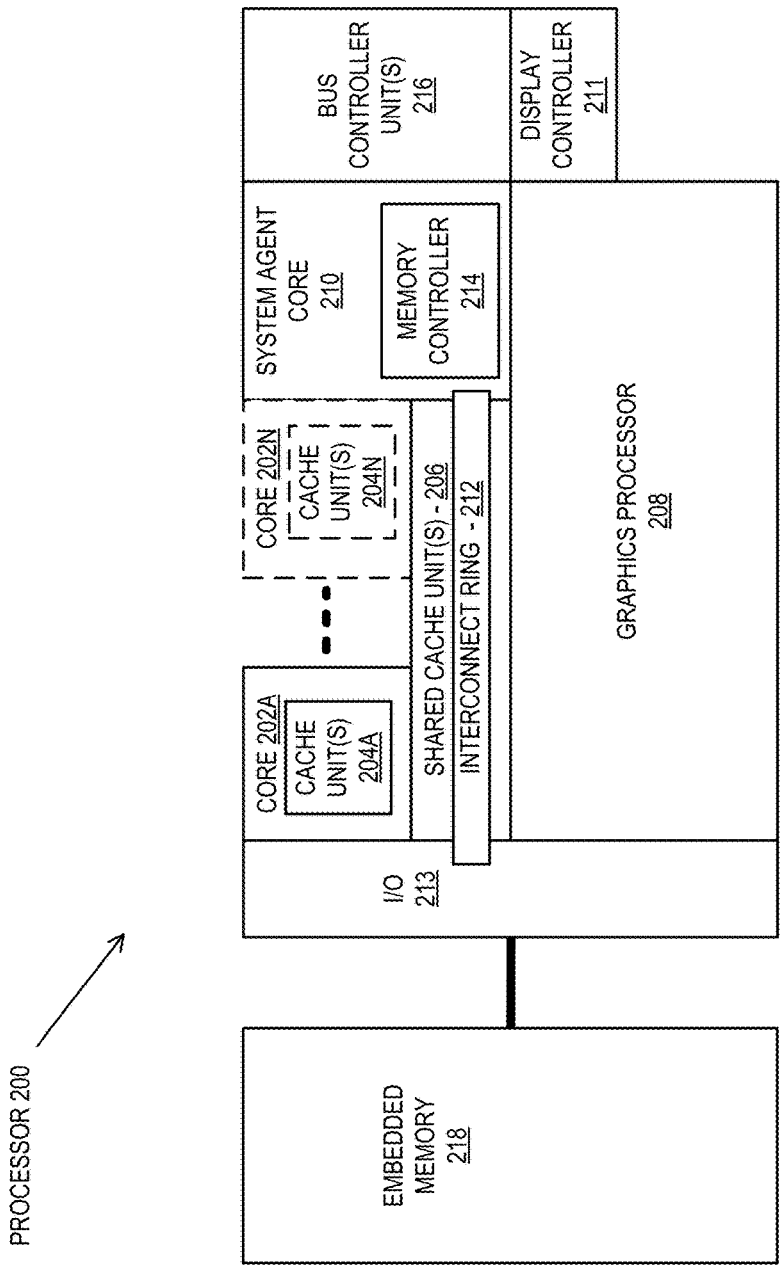
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
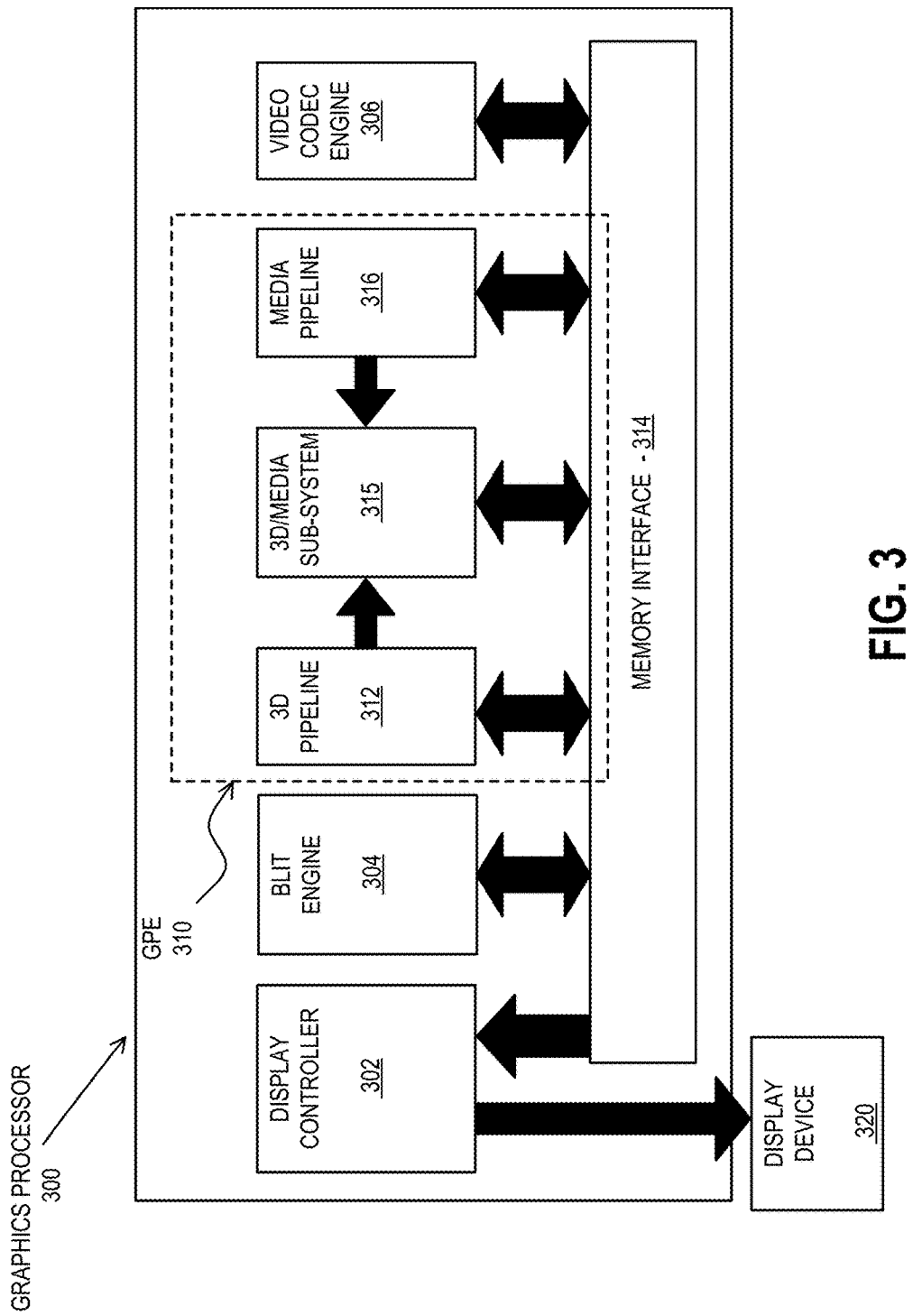
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
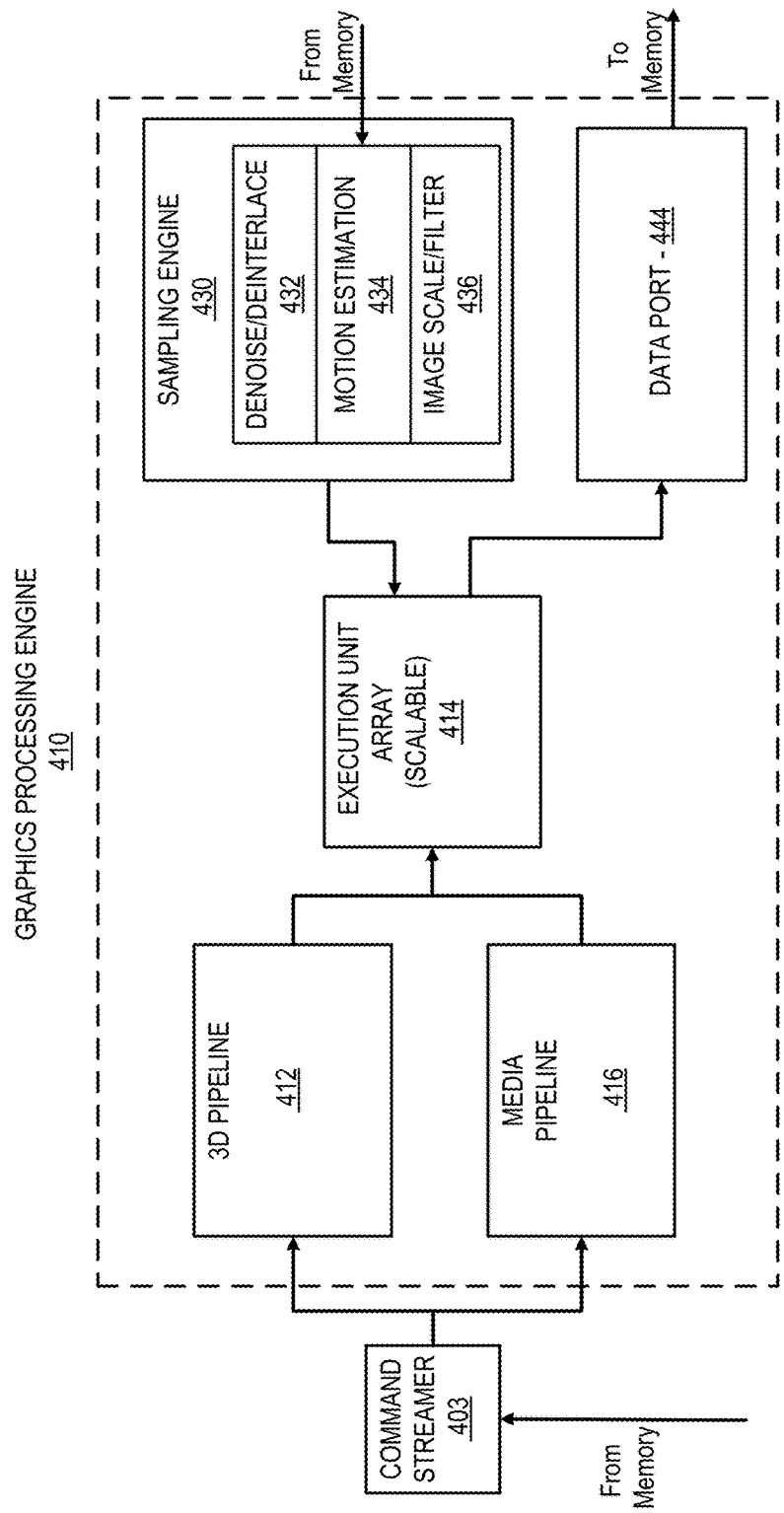
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
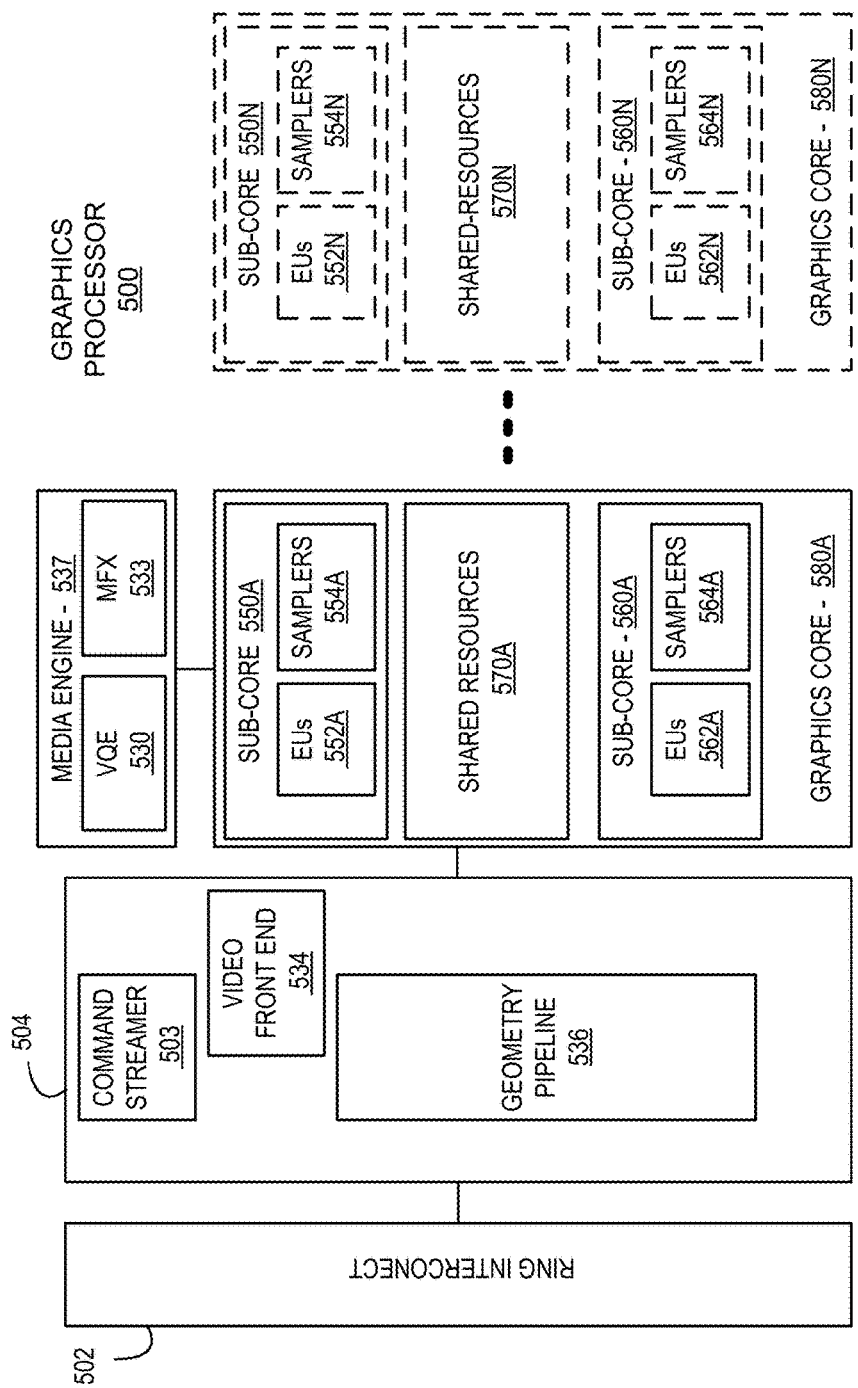
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-

560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
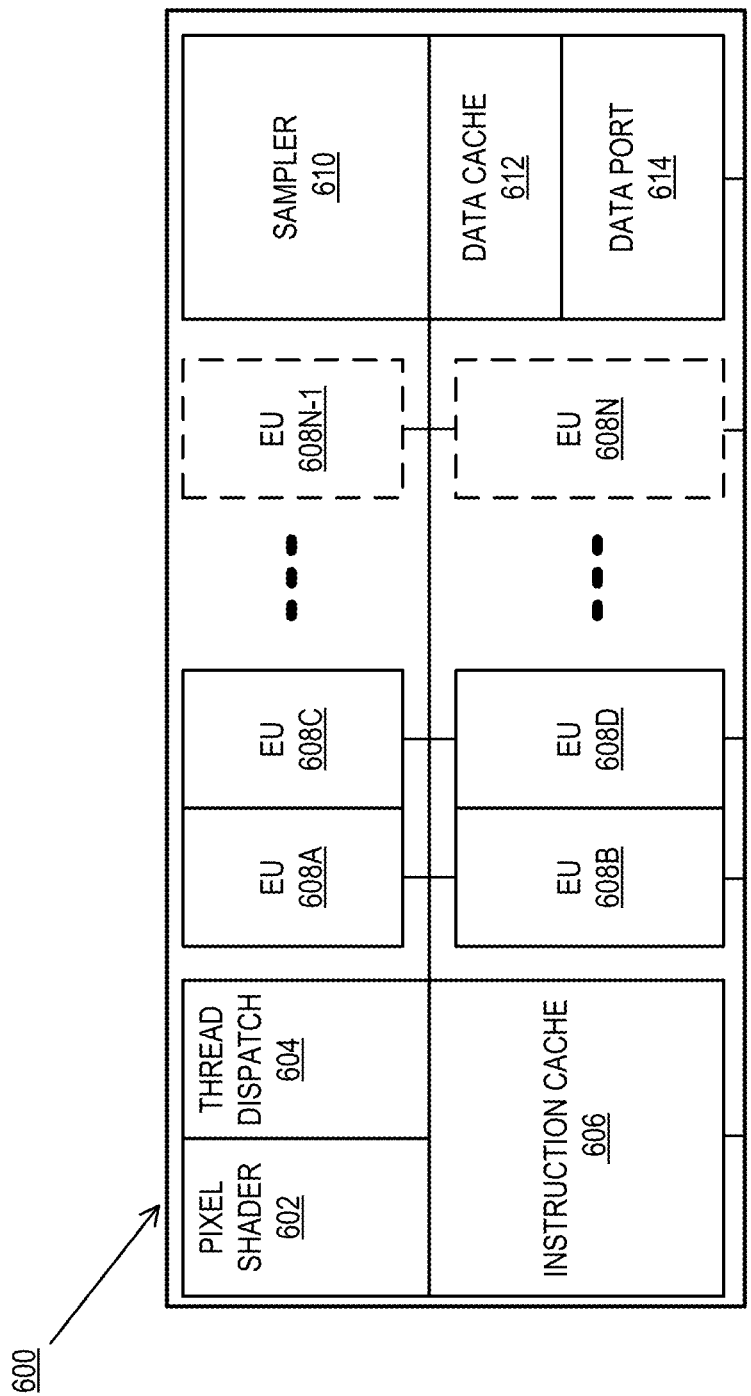
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
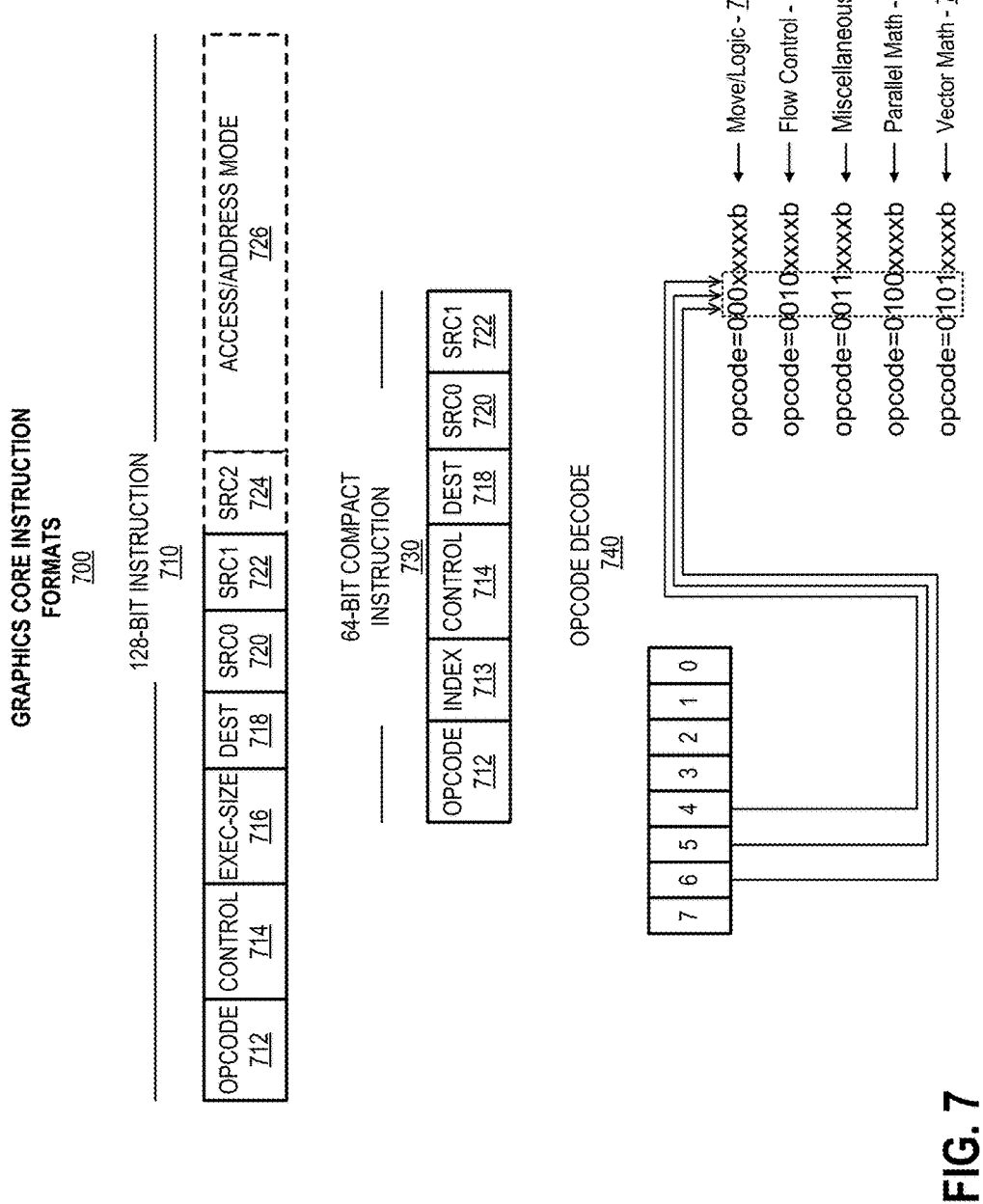
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710.

A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
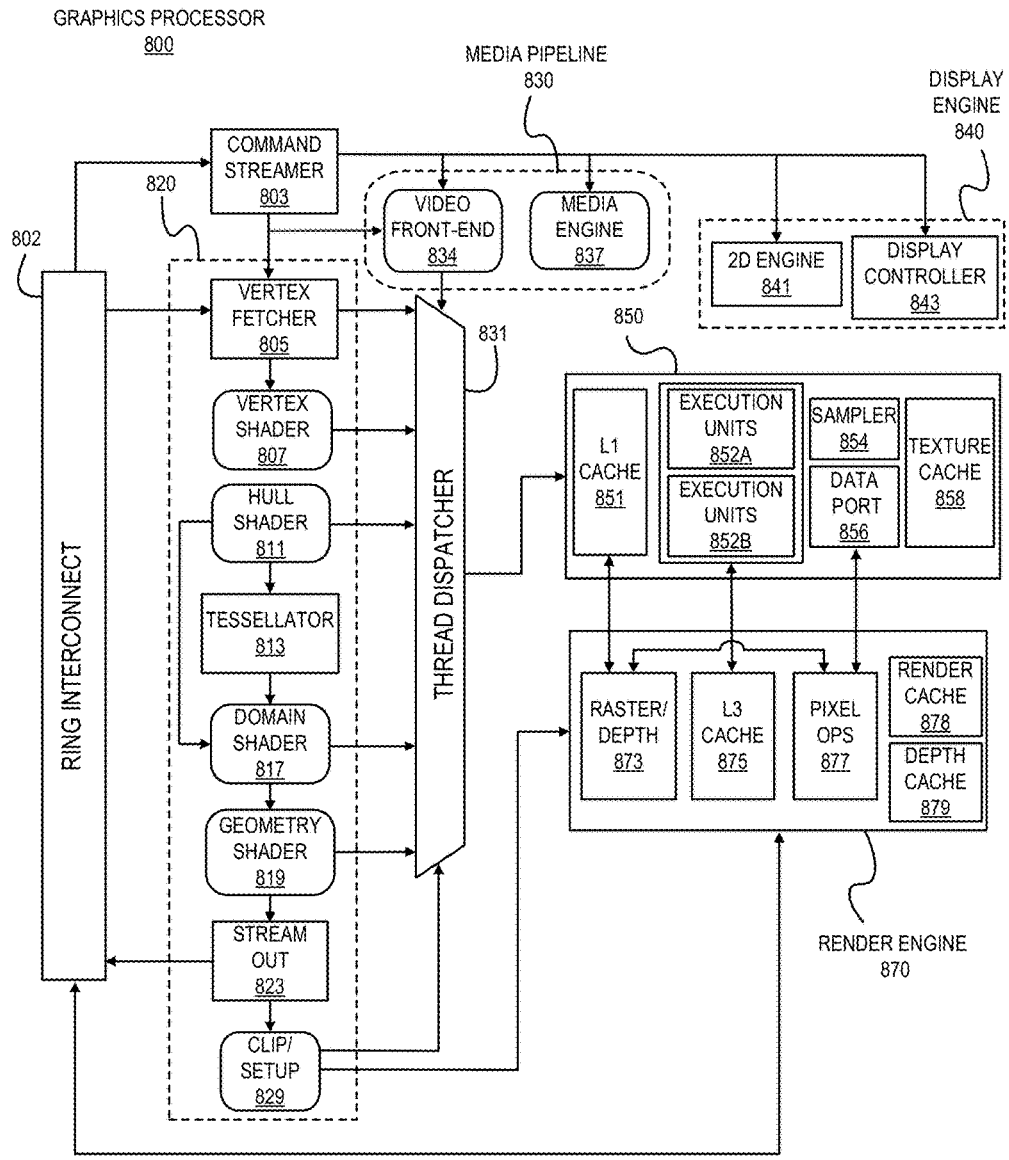
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
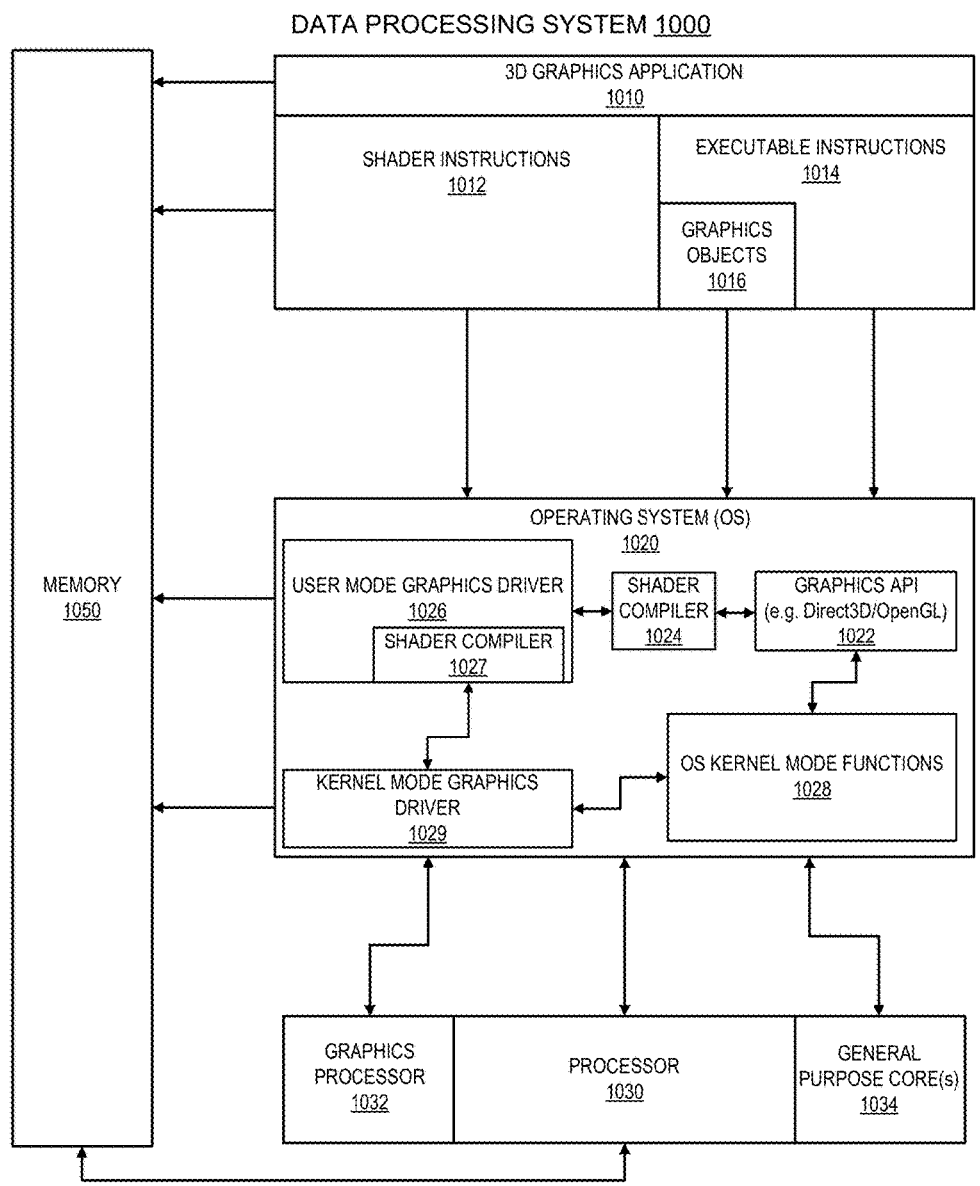
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
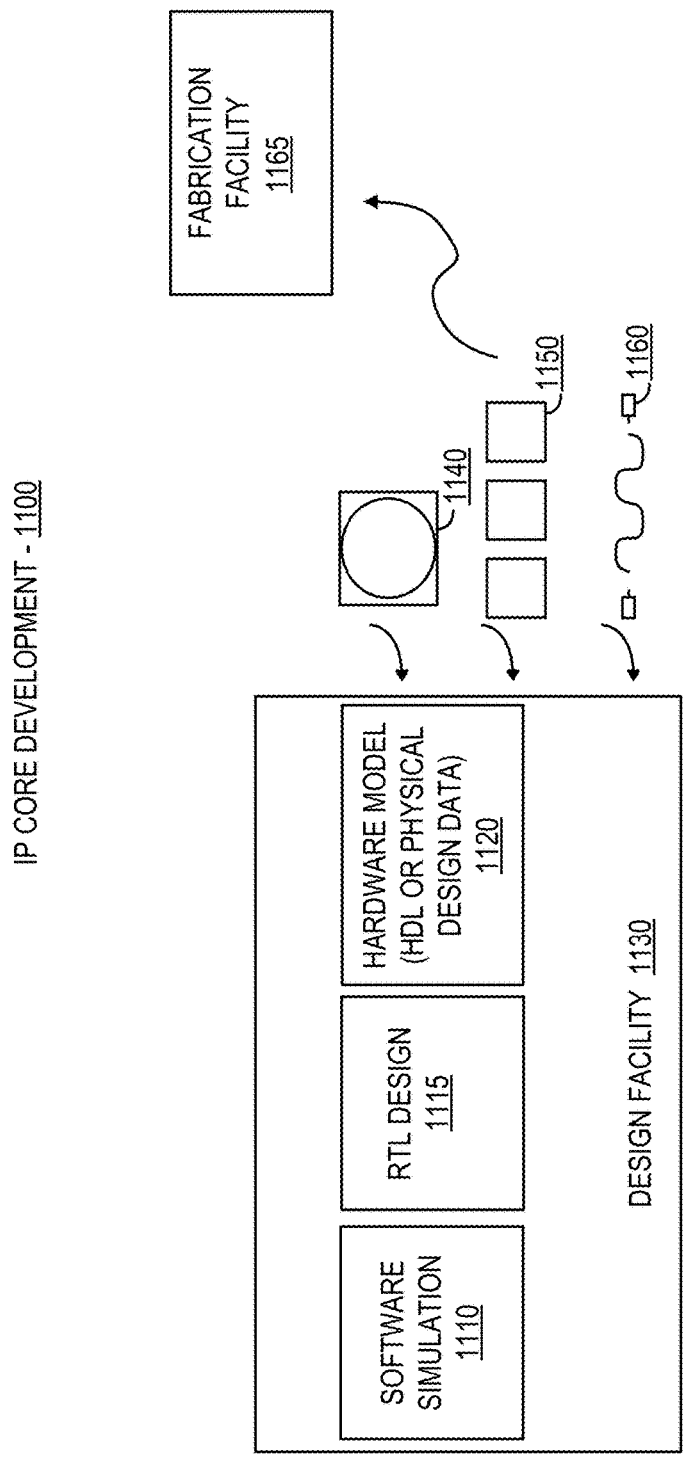
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
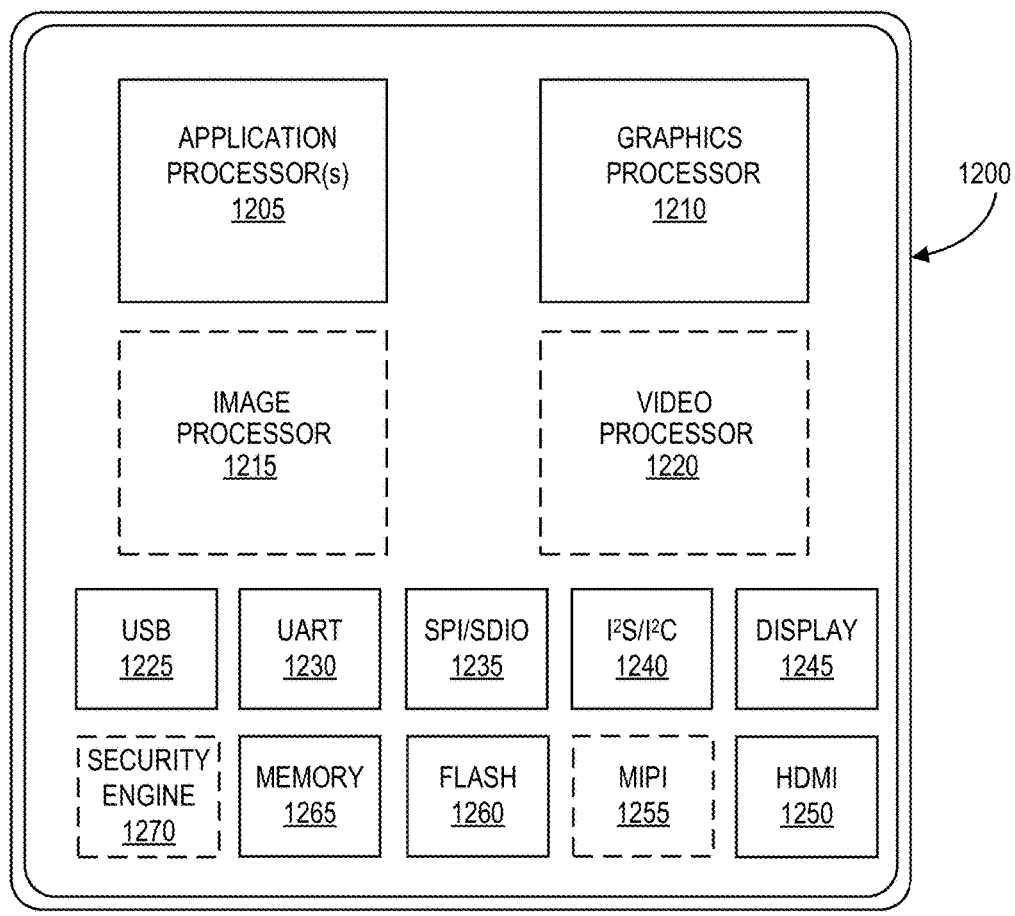
FIG. 12 illustrates an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Method and Apparatus for Color Buffer Compression

As mentioned, graphics rendering may generate an image or images from model data using a wide range of computer implemented techniques. In some implementations, the color buffer may be the largest bandwidth consumer in the graphics pipeline and system performance may be enhanced by color compression techniques.

The aim of such compression techniques, in general, may be to achieve a bit budget. For example, memory bandwidth may be associated with a limit or a specific cache line size or the like that may provide limits (e.g., 512 bits per cache line) for memory transactions. If a compression technique may transmit or store data less than or equal to the limit, the number of transactions associated with the data may be reduced saving power and increasing performance. Therefore, if color data may be compressed to meet the bit budget, the compression may be considered successful and the data may be stored as compressed. If the bit budget is not met, the compression may have failed and the data may be stored uncompressed since the compression would not save on memory transactions or the like. The greater rate at which a compression technique achieves successful compression of data (i.e., meets a desired bit budget), the greater the system performance will be enhanced.

Commonly, color data may be compressed using lossless compression techniques such that the color data is encoded without quality loss. Using lossless techniques may limit attainable compression rates and the rate of successful compressions may be limited. If, however, minor losses of quality are acceptable, greater compression rates may be attained using lossy compression techniques, which may provide more successful attempts at compression and may save memory bandwidth. Such bandwidth savings may increase performance and/or reduce power consumption in various devices.

As will be described in greater detail below, in some examples, graphics rendering and compression techniques may operate on tiles. A tile may include any number of individual pixels, such as a rectangular region of W×H pixels, where W is the width of a tile and H is the height of a tile in pixels. For example, a tile may include an 8×4 pixels having 32 pixels or 4×4 pixels having 16 pixels or the like. In some examples, color values may be determined for the pixels such that each pixel has a color value. Furthermore, the color values may each have color sub-values corresponding to color channels. For example, a color may be represented using a red green blue alpha (RGBA) color value with four sub-values corresponding to each of the four color channels (R, G, B, and A). The techniques discussed herein may operate on any color value type represented in any color space. However, in some examples, color values may be mapped to a color space, such as a color space more suitable to compression using the techniques discussed herein. In some examples, color values may be mapped to a pseudo luminance/intensity orange chrominance green chrominance alpha (YCoCgA) color space such that the color values have sub-values corresponding to the four color channels Y, Co, Cg, and A.

In any event, a bounding box may be determined for the color sub-values such that the bounding box comprises one or more bounding ranges for the one or more color channels. The bounding box may include any number of bounding ranges such as, for example, one bounding range for each color channel. In some examples, each bounding range may correspond to a range of values from a minimum sub-value for the color channel to a maximum sub-value for the color channel. In some examples, the bounding ranges may be quantized to generate sets of available values. For example, depending on a size (e.g., a "width") of the bounding range, a number of available values within the range may be determined. In some examples, the number of available values may be a factor of 2, such that available values may be encoded. If a bounding range only has one value, for example, no quantization is needed. In other examples, 2, 4, 8, 16, or 32, or the like number of available values may be made available depending on bandwidth constraints as is discussed further herein. In some examples, a bounding range may be fully describable using the quantization. For example, if the range includes 8 values, 8 available values may fully describe the bounding range. However, often, the number of available values will be less than the width of the bounding range and subsequent encoding of the color sub-values may be a lossy encoding such that data is lost in the codec described herein. In some examples, the width may be set at an actual width of the bounding range. In some examples, the number of available values may be no greater than a limit such as 32 or the like.

In some examples, the available values of the quantized bounding range may be associated with index values. In some examples, k-bit index values may be needed to be associated with a quantized bounding ranges quantized with 2k index values. For example, 8 index values may be encoded with 3-bit index values, 16 index values may be encoded with 4-bit index values, and so on. In some examples, the color sub-values may be encoded by associating the color sub-value with an index value corresponding to an available value closest to the actual color sub-value. Such encoding may be performed for some or all of the color channels to generate encoded index values that encode the sub-values. In some examples, graphics data including the encoded index values and data associated with the bounding box (e.g., data to describe the bounding range(s) of the bounding box) may be stored in memory.

As is discussed in greater detail below, in general, some compression techniques may achieve a desired bit budget. For example, memory bandwidth may be associated with a limit or a cache line or the like which may provide limits (e.g., 512 bits or the like) for memory transactions. If a compression technique may transmit or store data less than the limit, the number of transactions associated with the data may be reduced saving power and increasing performance. If the compression succeeded, the graphics data as described may be stored. Alternatively, if the compression failed, the graphics data may be further compressed by shaving or reducing the number of bits used to quantize and encode the bounding range. For example, bits may be removed one-by-one from the channels in an order (e.g., in the order of A, Cg, Co, Y in the YCoCgA example) until a bit budget is met. For example, if a bit is removed from the quantization of the A channel bounding range, the range may go from being represented by 128 available values to 64 available values or the like. Subsequently, the bounding range may be re-quantized to determine a reduced set of available values, the reduced set of available values may be associated with index values, and the sub-values corresponding to the A channel may be re-encoded. The number of bits in the now reduced graphics data may be compared to the bit budget and if it succeeds, the data may be stored. If it fails, the bit shaving or reducing may continue until the bit budget is achieved. For example, a single bit may be iteratively removed from the Cg channel, the Co channel, and then the Y channel, then a second bit may be iteratively removed from the A channel, the Cg channel, the Co channel, and then the Y channel, and so on until the bit budget is achieved. In other examples, such an iterative technique may be replaced by a technique that determines a number of bits that need to be shaved or removed to meet the budget and the described techniques may be applied using the reduced bounding ranges. In such techniques a minimum bit budget may be used such that the color data may not use less than certain bit widths (for example, 3 bits and 8 available values or 4 bits and 16 available values or the like). Ultimately, if the bit budget is not met based on such minimum threshold limits, the compression may have failed and the color values may be stored uncompressed using standard techniques.

In some examples, the data encoded using such techniques may be read from memory and decoded. For example, graphics data including the described encoded index values and data associated with the bounding box (e.g., data to in some manner describe the one or more boundary ranges such as maximum and minimum values in the range) may be accessed. The graphics data may also include width(s) of the boundary range(s). In some examples, available values may be determined based on the data associated with the bounding box and the width(s). In some examples, decoded color values for the pixels may be determined based on the determined available values and the encoded index values. In some examples, the decoded color values may be lossy with respect to the (original) color values prior to compression.

As will be discussed in greater detail below, in some examples, a system may determine color data (e.g., via rendering to a tile and/or accessing color data associated with the tile), compress the color data using the techniques discussed herein, and store the resulting graphics data (e.g. encoded index values and data associated with a bounding box) in memory. The system may also, in some examples, access the graphics data and determine decoded color values for a tile based on the accessed graphics data. In some examples, the decoded color values may be lossy with respect to the original determined color values. The following discussion may use such a system and techniques for exemplary purposes. In other examples, a system may receive compressed graphics data (e.g. encoded index values and data associated with a bounding box) from another system or source. In such examples, the system may determine decoded color values based on the received graphics data using the techniques discussed herein. Such a system may be implemented via software, a processor, or device as discussed herein. Further, in some examples, a system may compress color data and transmit the resulting graphics data (e.g. encoded index values and data associated with a bounding box) for use by another system or systems.

As discussed, compressing color values for multiple pixels, such as, for example, a tile of pixels may save significant bandwidth while transferring or storing graphics data in various computer implementations. Such bandwidth savings may increase performance and/or reduce power consumption in various devices.

Figure 13:
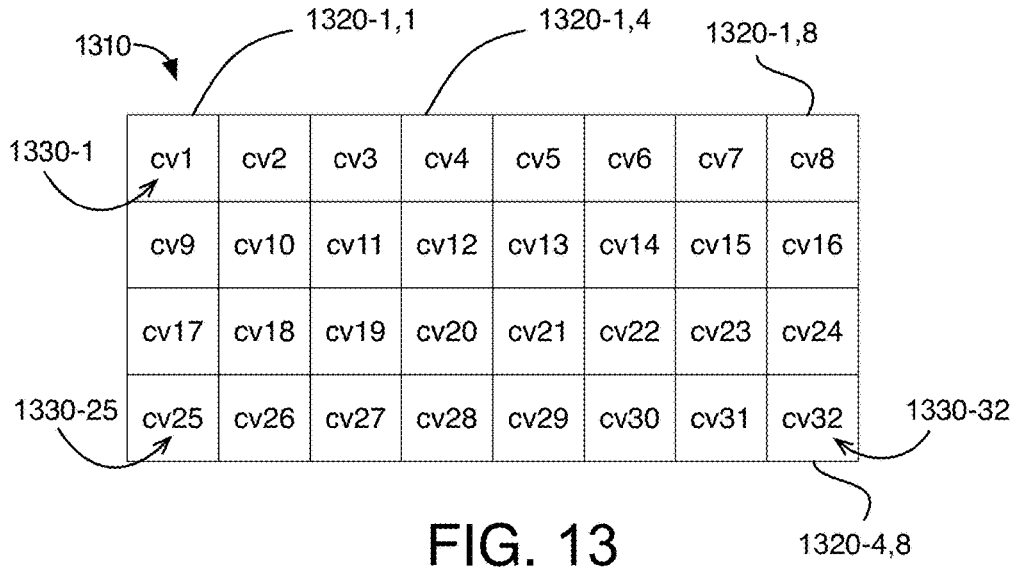
FIG. 13 is an illustrative diagram of an example tile of pixels having associated values.

FIG. 13 is an illustrative diagram of an example tile 1310 of pixels 1320 having associated color values 1330 (illustrated as color values cv1-cv32), arranged in accordance with at least some implementations of the present disclosure. As shown, tile 1310 may include multiple pixels 1320-1,1-1320-4,8. Tile 1310 may include any number of pixels. In some examples, tile 1310 may be 8 pixels wide by 4 pixels high (and may therefore include 32 pixels, as shown). Also as shown, individual pixels 1320-1,1-1320-4,8 may have or include an associated color value 1330. Color values 1330 may include any suitable color data such as graphics data or rendering data or the like. As is discussed herein, color values 1330 may include color data represented using any color model or color space or the like and color values 1330 each may include multiple color sub-values.

Figure 14:
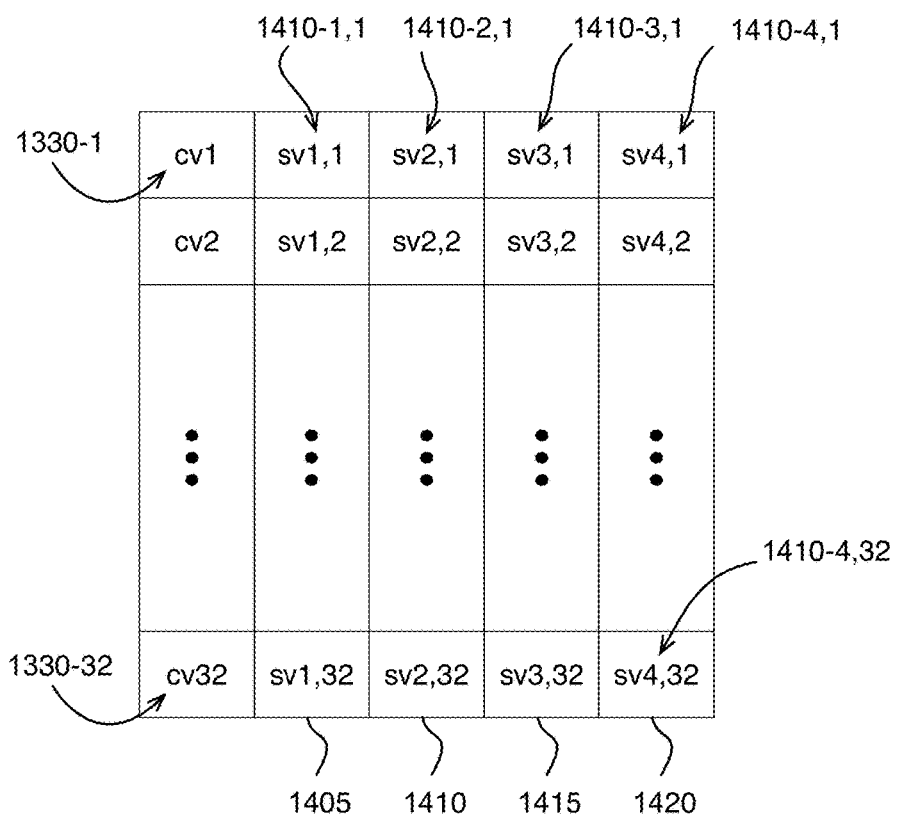
FIG. 14 is an illustrative diagram of example color sub-values of color values arranged to align color channels.

FIG. 14 is an illustrative diagram of example color sub-values 1410 of color values 1330 arranged to align color channels 1420, arranged in accordance with at least some implementations of the present disclosure. As shown, color values 1330 may each include multiple color sub-values 1410 (illustrated as sv1,1-sv1,32, sv2,1-sv2,32, sv3,1-sv3,32, and sv4,1-sv4,32) such that the sub-values correspond to multiple color channels 1420-1, 1420-2, 1420-3, and 1420-4. For example, color value 1330-1 (i.e., cv1) may include sub values 1410-1,1, 1410-2,1, 1410-3,1, and 1410-4,1. (i.e., sv1,1, sv2,1, sv3,1, and sv4,1). As shown, each sub-value 1410 may be associated with a color channel 1420. For example, sub-values 1410-1,1 to 1410-1,32 may be associated with a first color channel 1420-1, sub-values 1410-2,1 to 1410-2,32 may be associated with a second color channel 1420-2, and so on. In some examples, color channels 1420 may be color channels associated with a color space or color model or the like. For example, color channels 1420 may be associated with a red green blue alpha (RGBA) color space such that color channel 1420-1 includes red values for color values 1330, color channel 1420-2 includes green values for color values 1330, color channel 1420-3 includes blue values for color values 1330, and color channel 1420-4 includes alpha values for color values 1330.

Color values 1330 may be represented using any suitable number or type of color channels 1420. As discussed, in some examples, color values 1330 may include red green blue alpha (RGBA) color values. In other examples, color values 1330 may include a subset of RGBA values such as 8-bit red green blue alpha (R8G8B8A8) color values, 16-bit red green blue alpha (R16G16B16A16) color values, pseudo luminance/intensity orange chrominance green chrominance alpha (YCoCgA) color values, or the like. In such examples, color channels 1420 may correspond to the described color components. For example, in a YCoCgA color space, color channels 1420 may include a Y color channel 1420-1, a Co color channel 1420-2, a Cg color channel 1420-3, and an A color channel 1420-4. As shown in FIG. 14, color values 1330 may each include four color sub-values 1410. In other examples, color values 1330 may include two, three, or five color sub-value, or the like.

Color values 1330 may be determined or generated using any suitable technique or techniques such as for example, reading from memory, rendering graphics data, or the like. Furthermore, the techniques discussed herein may operate on color values 1330 represented using any color space. In some examples, it may be advantageous to map from a color space to a color space more suitable for the described compression techniques. For example, RGBA color data may be mapped to YCoCgA color data prior to performing the descried compression, as is discussed further herein with respect to FIG. 22. In some examples, determining color values 130 may include mapping from one color space to another color space.

Figure 15:
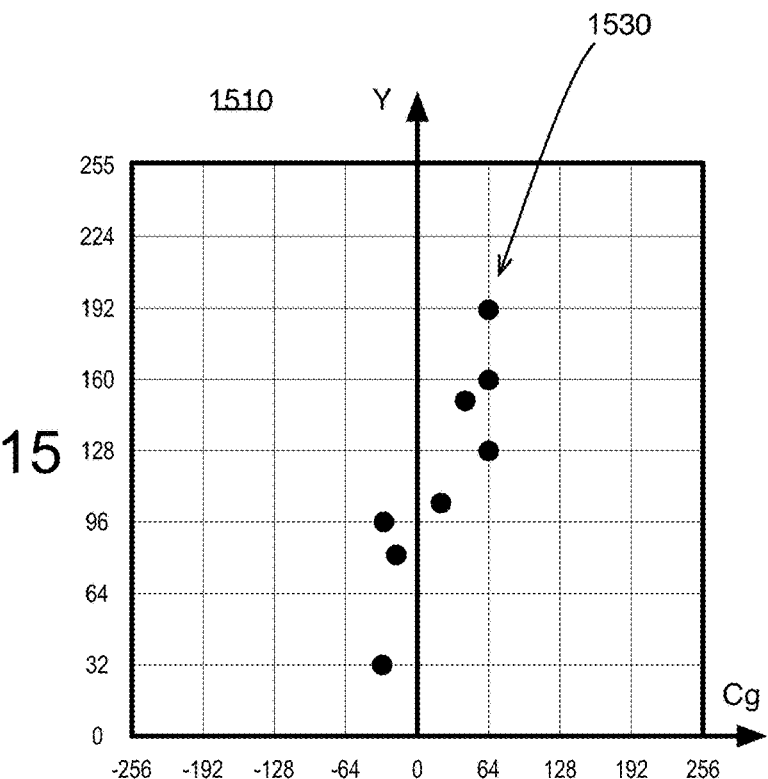
FIG. 15 is an illustrative diagram of example color values diagrammed on an example portion of a color space.

FIG. 15 is an illustrative diagram of example color values 1530 diagrammed on an example portion of a color space 1510, arranged in accordance with at least some implementations of the present disclosure. For example, color space 1510 may include a YCoCgA color space as discussed and color values 1530 may be represented via color space 1510. Although illustrated with respect to the color space YCoCgA color space, the embodiments discussed herein may be applied to any suitable color space. As shown, color space 1510 may include a Y component and a Cg component. In the illustrated example, the Co component and the A component are not shown for the sake of clarity of presentation. Also, in general, color values 1530 may include any number of color values 1530 such as 32 color values as described with respect to FIGS. 13 and 14. In the illustrated example, 8 color values are shown for the sake of clarity of presentation. As illustrated in FIG. 15 and illustrated further with respect to FIG. 16, the YCoCgA color space may be advantageous for the techniques described herein because color values 1530 for many scenes or tiles of scenes including natural scenes or tiles and scenes or tiles including people may be bunched substantially close together. As shown, color values 1530 may be illustrated with respect to color sub-values associated with a Y color channel and Cg color channel in FIG. 15.

Figure 16:
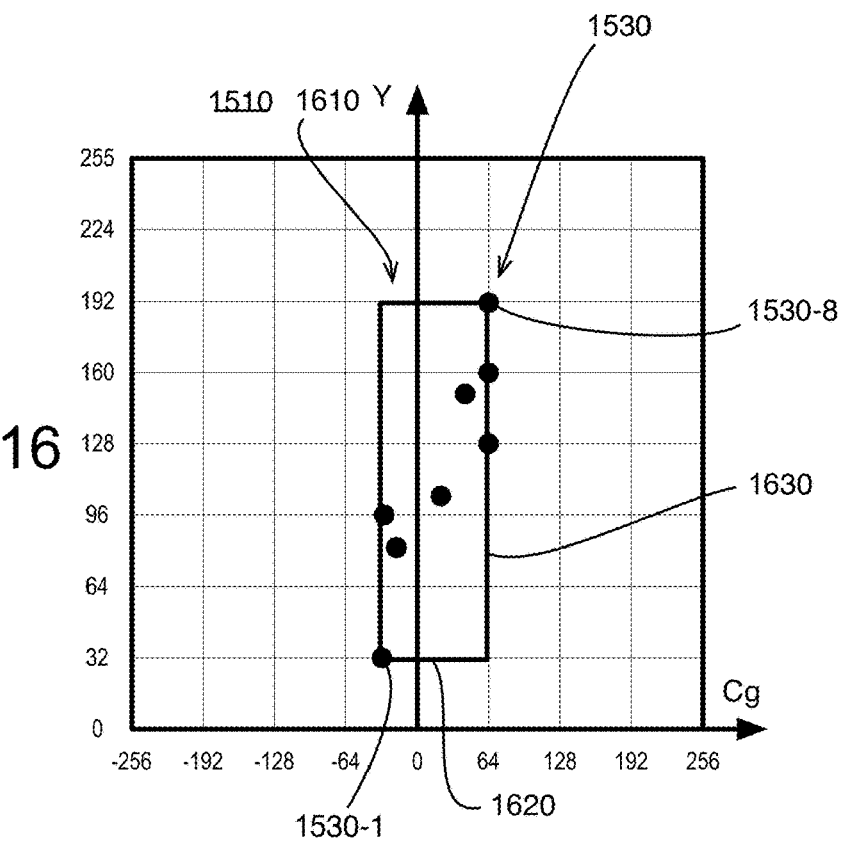
FIG. 16 is an illustrative diagram of an example bounding box for sub-values associated with color values.

FIG. 16 is an illustrative diagram of an example bounding box 1610 for sub-values associated with color values 1530, arranged in accordance with at least some implementations of the present disclosure. As shown, bounding box 1610 may include bounding range 1620 and bounding range 1630. Bounding range 1620 may be associated with the Cg color channel (and the sub-values corresponding to the Cg color channel) and bounding range 1630 may be associated with the Y color channel (and the sub-values corresponding to the Y color channel). Furthermore, in some examples, although not illustrated for the sake of clarity, bounding box 1610 may include a bounding range associated with the Co color channel (and the sub-values corresponding to the Co color channel) and a bounding range associated with the A color channel (and the sub-values corresponding to the A color channel). In some examples, bounding ranges 1620 and 1630 of bounding box may extend from a minimum sub-value to a maximum sub-value for the associated color range. For example, bounding range 1630 may extend from about 32 (the Y sub-value associated with color value 330-1) to about 192 (the Y sub-value associated with color value 330-8) and bounding range 1620 may extend from about—32 (the Cg sub-value associated with color value 330-1) to about 64 (the Cg sub-value associated with color value 330-8). Also, as shown, each of color values 1530 is within bounding box 1610. Bounding box 1610 (and the associated bounding ranges) may be determined using any suitable technique or techniques such as, for example, determining a minimum and maximum sub-values for individual color channels.

Figure 17:
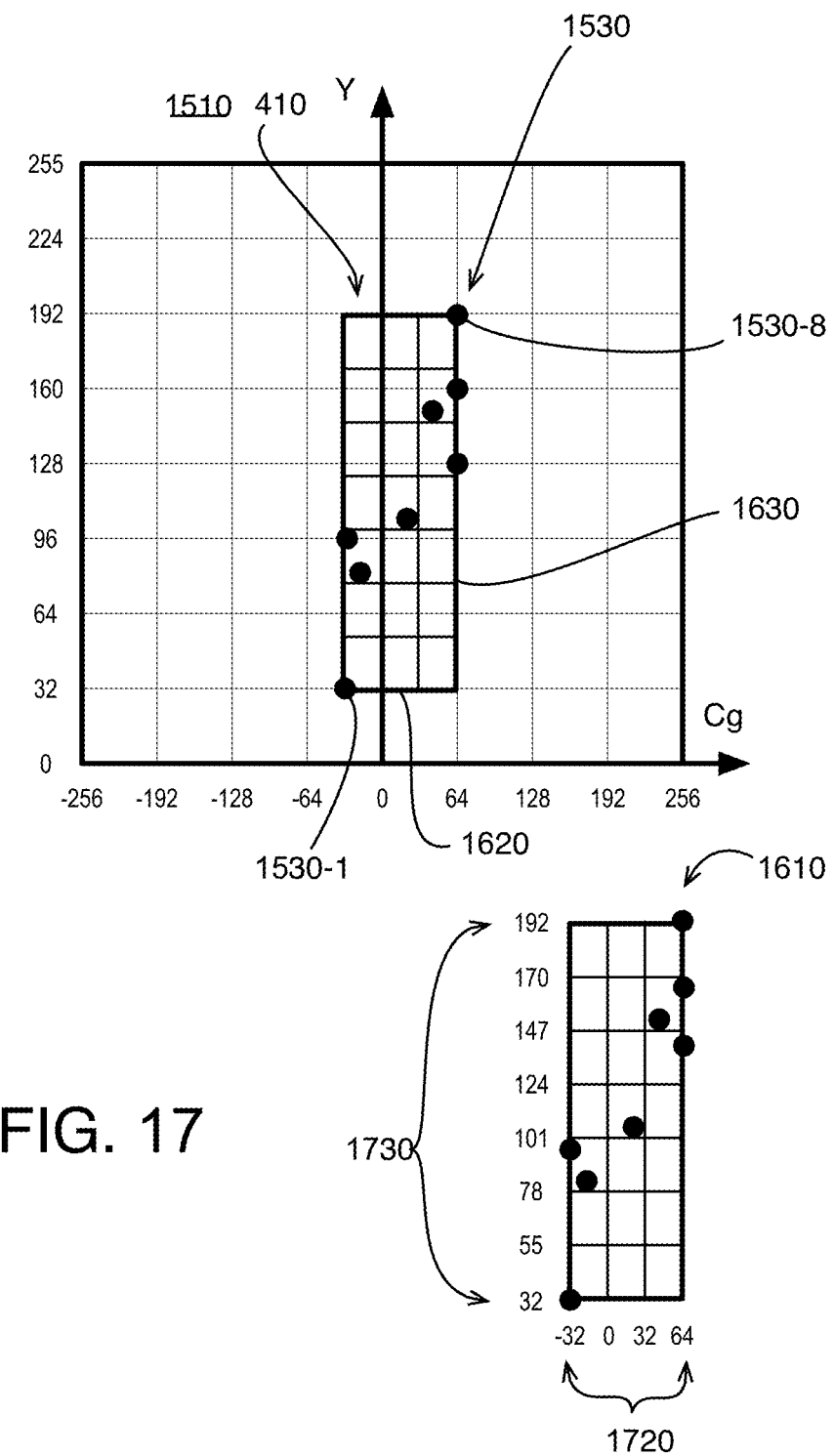
FIG. 17 is an illustrative diagram of an example quantization of a bounding box.

FIG. 17 is an illustrative diagram of an example quantization of bounding box 1610, arranged in accordance with at least some implementations of the present disclosure. As shown, bounding range 1620 and bounding range 1630 of bounding box 1610 may be quantized to generate a set of available values 1720 for bounding range 1620 (and the associated sub-values of the color channel of boundary range 1620) and a set of available values 1730 for bounding range 1630 (and the associated sub-values of the color channel of boundary range 1620). In FIG. 17, bounding box 1610 is illustrated twice: once diagrammed on color space 1510 and repeated outside of color space 1510 for the sake of clarity of presentation. Bounding box 1610 may have any number of bounding ranges, as discussed herein.

In the illustrated example, available values 1730 may include 8 available values and available values 1720 may include 16 available values. The available values may include any number of available values (up to the number of values needed to describe the bounding range). In some examples, the number available values may be 2k such that the available values may be indexed using a k-bit index value as is discussed further herein. In some examples, a bit width may be set for each boundary range. In some example, the bit width may be a number of bits needed to represent the boundary range. In the illustrated example, boundary range 1730 may have a minimum value of 32 and a maximum value of 192, such that the size of boundary range 1730 is 160 (e.g., rangeY=max (Yi)−min (Yi)=192−32=160), where i is a counter variable for each of the sub-values in the Y channel). In order to fully represent a bounding range of 160, 161 available values may need to be available, for example. To index and/or encode 161 values, a bit width of 2k>161 may be needed such that the required bit width to fully describe the 161 values may be k=8 (giving 2k=256, please note k=7 provides 128 available values).

In some examples, the bit width for each boundary range may be an important factor in the compression process discussed herein. For example, a lower bit width may provide for greater compression but fewer available values and therefore more data loss in compression. Higher bit widths may provide for less data loss in compression but a lower compression rate. In some examples, the bit width may be the minimum number of bits needed to provide for all of the available values. In some examples, a limit may be placed on the bit width or the bit width may provide for fewer than all of the available values as is discussed herein. As used herein "bit width" may be any such width for a boundary range. As is discussed further herein, in some examples, a bit width may start (e.g., at a first iteration) at a value needed to provide for all of the available values in a boundary range or a maximum value and, in subsequent iterations, the bit width may be reduced by one or more bits (e.g., one at a time in multiple iterations) to a reduced bit width or just "bit width" that may provide for fewer than all of the available values as described. In such examples, the bit width of one or more boundary ranges may be reduced until graphics data representing color values 130 may meet a bit budget as discussed further herein. In some examples, bit widths that do not provide for encoding of all of the available values in a boundary range may provide "lossy" encoding or compression techniques. Furthermore, in some examples, for one or more color channels, color values 330 may contain only a single value. In such cases, no bits may be stored for the channel, as is described further herein below.

In some examples, a bit width may be determined using the following code:

```
1    UINT Width(UINT range)
2    {
3        for (UINT w = 0; w < 32; ++w) {
4            if ((range >> w) == 0) return (w);
5        }
6        return 32;
7    }
``` where Width may the number of bits needed to represent range, which may be a size of a bounding range. It is noted that the provided code is exemplary. There may be simpler and more efficient ways to implement the determination of bit width in hardware, for example.

As discussed, in some examples, the bit width associated with available values 1730 and/or the bit width associated with available values 1720 may be determined by iteratively reducing bits to meet a bit budget. In other examples, the associated bit widths may be determined based on the size of the associated boundary range, the relative importance of a color channel, a maximum bit width value, a predetermined bit width value, or the like. Also as discussed, the available values may be all of the values in a particular bounding range or a subset of all of the values in a particular bounding range. As will be appreciated, available values 1730 and 1720 and their associated bit widths are for illustrative purposes and are not meant to be limiting.

Figure 18:
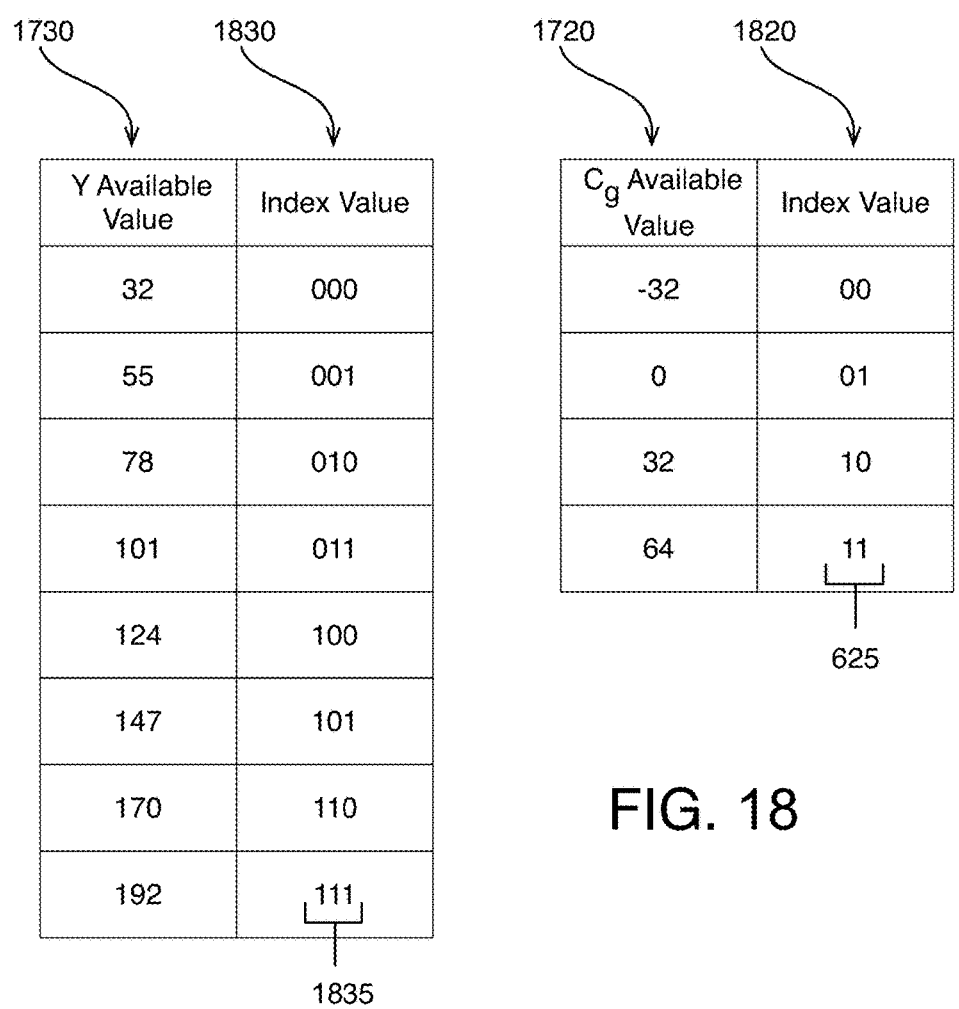
FIG. 18 is an illustrative diagram of example index values associated with example available values.

FIG. 18 is an illustrative diagram of example index values 1830, 1820 associated with example available values 1730, 1720, arranged in accordance with at least some implementations of the present disclosure. As shown, available values 1730 (i.e., the set of available values for the Y channel) may be associated with index values 1830 (i.e., the set of index values for the Y channel). Also as shown in FIG. 18, index values 1830 may have a bit width 1835 of 3 bits such that $2^3=8$ available values 1730 may be indexed for the Y channel and index values 1820 may have a bit width 1825 of 2 bits such that $2^2=4$ available values 1730 may be indexed for the Y channel. Available values 1730 and 1720 may be associated with index values 1830 and 1820, respectively, using any suitable technique or techniques. As shown, in some examples, the index values may be applied in an increasing order to the associated available values.

Turning now to FIG. 19, FIG. 19 is an illustrative diagram of example encoded index values 1928 and 1938 corresponding to color values 330, arranged in accordance with at least some implementations of the present disclosure. As shown, color values 330 (illustrated as cv1-8) may have associated Y channel sub-values 1930 (e.g., "actual" Y channel sub-values). In some examples, each Y channel sub value 1930 may be associated with a quantized Y channel available value 1935, as shown. For example, referring to FIG. 17, color value 330-1 may have a Y channel sub-value of 32, which is illustrated in FIG. 19 as Y channel sub-value 1930-1. Y channel sub-value 1930-1 may be associated Y channel available value 1935-1, which in this example, may be the same value. In some examples, Y channel sub-values 1930 may be associated with the closest Y channel available value 1730 (please refer to FIG. 18). Furthermore, Y channel sub-value 1930 of color value 330-1 may be encoded by associating Y channel sub-value 1935-1 with encoded index value (EIN as illustrated) 1938-1 (please refer also to FIG. 18). Similarly, the Y channel sub values 1930-2 through 1930-8 of color values 330-2 through 330-8 may be similarly associated with a closest of Y channel available values 1730 to determine Y channel available values 1935-2 through 1935-8. As shown, in some examples, the Y channel available value 1935 may be different than the Y channel sub-value 1930, which indicates a loss of information and therefore lossy compression. Y channel sub-values 1930-2 through 1930-8 may be encoded with encoded index values 1938-2 through 1938-8 by associating Y channel sub-values 1930-2 through 1930-8 with the encoded index value corresponding to Y channel available values 1935-2 through 1935-8, via the set of index values 1830, as shown in FIG. 18.

Similarly, Cg channel sub values 1920 may be associated with a quantized Cg channel available values 1925, as shown. For example, referring to FIG. 15, color value 1330-1 may have a Cg channel sub-value of −32, which is illustrated in FIG. 19 as Cg channel sub-value 1920-1. Cg channel sub-value 1920-1 may be associated Cg channel available value 1925-1, which in this example, may be the same value. In some examples, Cg channel sub-values 1920 may be associated with the closest Cg channel available value 1720 (please refer to FIG. 18) as discussed herein. Furthermore, Cg channel sub-value 1920 of color value 1330-1 may be encoded by associating Cg channel sub-value 1925-1 with encoded index value 1928-1 (please refer also to FIG. 18). Similarly, the Cg channel sub values 1920-2 through 1920-8 of color values 1530-2 through 1530-8 may be similarly associated with a closest of Cg channel available values 1720 to determine Cg channel available values 1925-2 through 1925-8. As discussed, in some examples, the Cg channel available value 1925 may be different than the Cg channel sub-value 1920. Cg channel sub-values 1920-2 through 1920-8 may be encoded with encoded index values 1928-2 through 1928-8 by associating Cg channel sub-values 1920-2 through 1920-8 with the encoded index value corresponding to Cg channel available values 1925-2 through 1925-8, via the set of index values 1820, as shown in FIG. 18.

Furthermore, any number of color channels may be encoded using the described techniques. For example, in the YCoCgA color space, Co and A encodings may be performed for color values 330. In some examples, each color channel may be encoded or compressed as described. In other examples, one or several but not all of the color channels may be encoded or compressed. For example, bounding box 410 may include one, two, three, or four, or the like bounding ranges. The bounding range(s) may be quantized with a number of available values that may be indexed with index values having an associated bit width (e.g., there may be 2k available values for a bit width of k bits).

In some examples, encoded index values 1928, 1938 may save substantial memory bandwidth in comparison with the associated sub-values 1920, 1930. As discussed, the aim of the discussed compression techniques may be to meet a desired bit budget. For example, memory bandwidth may be associated with a limit or a cache line or the like which may provide limits (e.g., 512 bits or the like) for memory transactions such that the bit budget may be 512 bits. In other examples, the bit budget may be associated with tile 1310 (please refer to FIG. 13) such that the data associated with tile 1310 may need to be compressed by 50% or the like and the bit budget may half the number of bits allocated to tile 1310 of pixels 1320, or the like. For example, the discussed techniques may apply a 2:1 compression ratio.

In some examples, if graphics data including the encoded index values and data associated with the bounding box meets the desired bit budget, the graphics data may be stored using the described compression techniques. If the desired bit budget is not met, the graphics data may be stored uncompressed or the graphics data may be further compressed to meet the bit budget as discussed herein. Ultimately, if the bit budget is not met (despite the further compression efforts), the compression may have failed and the color values may be stored uncompressed using standard techniques.

Figure 20:
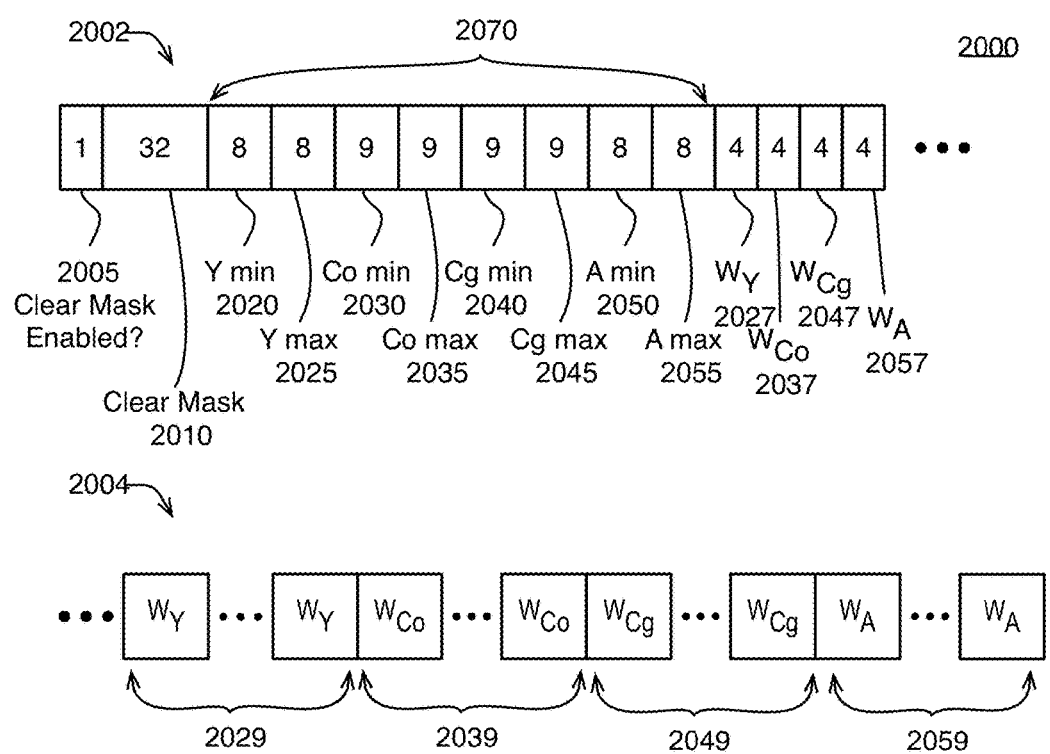
FIG. 20 is an illustrative diagram of example compressed graphics data.

FIG. 20 is an illustrative diagram of example compressed graphics data 2000, arranged in accordance with at least some implementations of the present disclosure. As shown in FIG. 20, graphics data 2000 may include a header portion 2002 and a data portion 2004. In some examples, header portion 2002 may include a clear mask bit 2005 (of 1 bit as shown) to indicate whether a clear mask is enabled and/or an optional clear mask 2010 (if clear mask enabled bit 2005 is enabled). Clear mask techniques are known in the art and will not be described in any greater detail. It is important to note that if a clear mask technique is used and if clear mask bit 2005 is enabled, optional clear mask 2010 may use a portion of any available bit budget.

As shown, header portion 2002 may also include Y min 2020 (8 bits), Y max 2025 (8 bits), Co min 2030 (9 bits), Co max 2035 (9 bits), Cg min 2040 (9 bits), Cg max 2045 (9 bits), A min 2050 (8 bits), and A max 2055 (8 bits), which may provide bounding box data 2070. For example, given the illustrated maximum and minimum values, the bounding ranges may be determined such that the described bounding ranges extend from the associated minimum value to the associated maximum value, for example. Although illustrated with respect to YCoCgA color data to continue the above illustrated example, graphics data 2000 may include any color data. Also as shown, header portion 2002 may include Y width (illustrated as W) 2027, Co width 2037, Cg width 2047, and A width 2057, which may provide a bit width for the associated color channels, bounding ranges, and/or encoded index values as discussed herein.

Also as shown in FIG. 20, graphics data 2000 may include data portion 2004 including Y color channel encoded index values 2029 (having a bit width of WY), Co color channel encoded index values 2039 (having a bit width of WCo), Cg color channel encoded index values 2049 (having a bit width of WCg), and A color channel encoded index values 2059 (having a bit width of WA). In some examples, the encoded index values may correspond to encoded index values 1928, 1938 as discussed above (e.g., Y color channel encoded index values 2029 may include encoded index values 1928 and Cg color channel encoded index values 2049 may include encoded index values 1938). As discussed herein, if a channel has no width (i.e., all of the sub-values are the same for a channel either before or after compression), no data may be stored for that channel in data portion 2004. For example, if all of the sub-values for the A channel are the same, no data may be stored such that A color channel encoded index values 2059 may be removed from data portion 2004 of graphics data 2000.

As will be discussed in greater detail below, a system, such as a computer-implemented system may be used to perform some or all of the various operations discussed herein with respect to FIGS. 13-20 and elsewhere herein.

FIG. 21 is a flow chart illustrating an example process 2100, arranged in accordance with at least some implementations of the present disclosure. In some examples, process 2100 may provide a computer-implemented method for providing compression in graphics rendering. In the illustrated implementation, process 2100 may include one or more operations, functions or actions as illustrated by one or more of operations 2102, 2104, 2106, 2108, 2110, and/or 2112. By way of non-limiting example, process 2100 will be described herein with reference to operations discussed with respect to FIGS. 13-20 above and example system 100 discussed below.

Process 2100 may be utilized as a computer-implemented method for providing compression in graphics rendering. Process 2100 may begin at operation 2102, "Determine Color Values Associated With Pixels", where a plurality of color values associated with pixels (e.g., of a tile of pixels) may be determined. For example, color values cv1-cv32 of tile 110 may be determined. As discussed above, the color values may have sub-values corresponding to the color channels of a color space. The color values may be determined by any suitable technique such as, for example, various rendering techniques. In other examples, determining the plurality of color values may include accessing graphics data (e.g., via a cache or buffer or the like) associated with the tile of pixels. For example, the graphics data may include the plurality of color values. Such accessing of graphics data may occur on a cache evict for example.

In other examples, determining the color values may include mapping from one color space to another color space. For example, color values may be mapped to a color space more suitable to compression using the techniques discussed herein.

Figure 22:
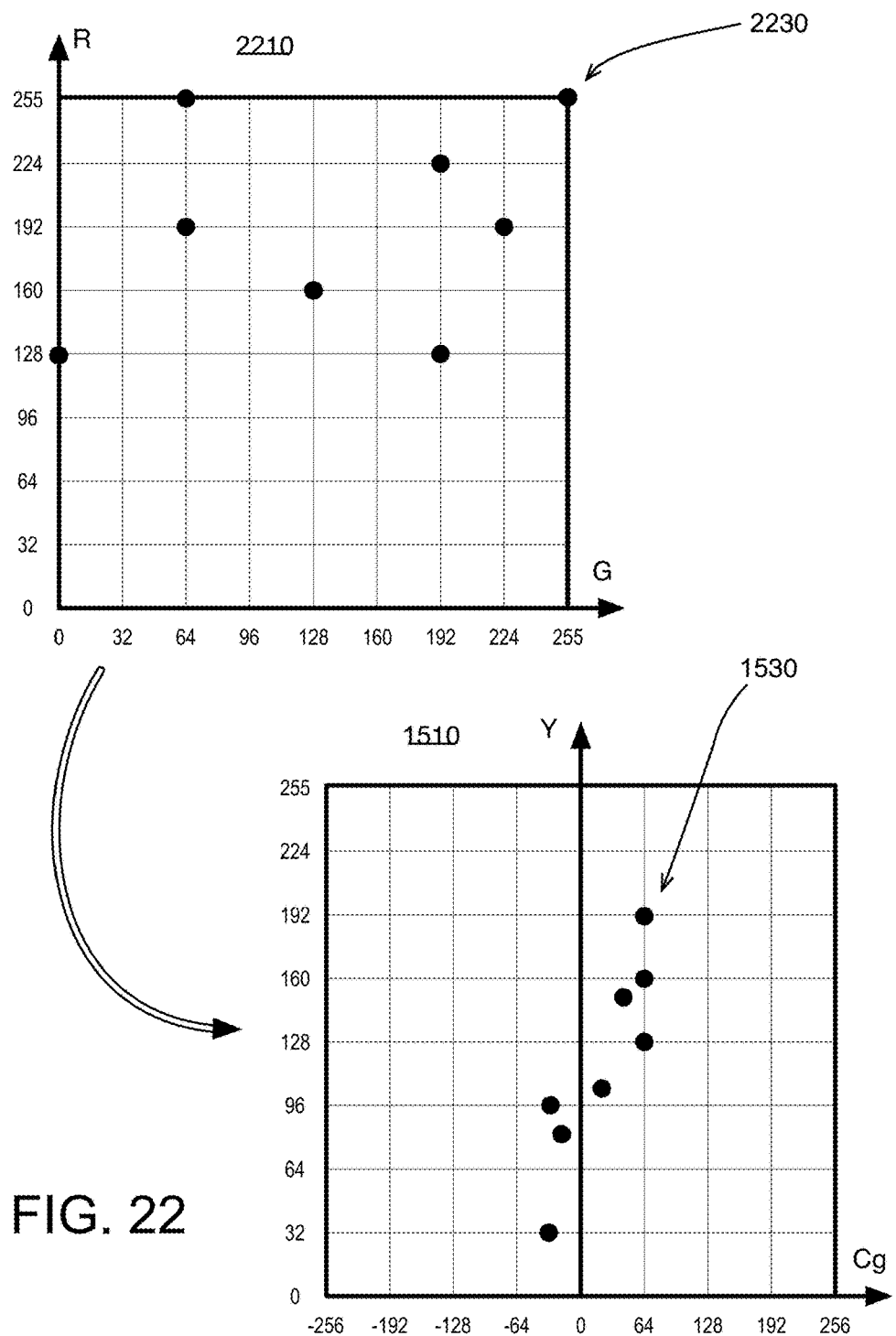
FIG. 22 illustrates an example mapping from a first color space to a second color space.

FIG. 22 illustrates an example mapping from a first color space to a second color space, arranged in accordance with at least some implementations of the present disclosure. As shown in FIG. 22, color values 2230 in color space 2210 may be mapped to color values 1530 in color space 1510. In the illustrated example, color space 2210 may be a red green blue alpha (RGBA) color space and wherein color space 1510 may be a pseudo luminance/intensity orange chrominance green chrominance alpha (YCoCgA) color space as discussed herein. For the sake of illustration, two color channels of the color spaces are illustrated for the sake of clarity of presentation; however, the mapping between color spaces may map all of the color channels. As shown in FIG. 22, mapping to a color space may be advantageous for the compression techniques discussed herein as color values 1530 may be more closely bunched than color values 2210. As discussed above, the YCoCgA color space may be advantageous for the techniques described herein because color values 1530 for many scenes or tiles of scenes including natural scenes or tiles and scenes or tiles including people may be bunched substantially close together.

Referring back to FIG. 21, processing may continue from operation 2102 to operation 2104, "Determine a Bounding Box with Bounding Range(s)", where a bounding box having one or more bounding ranges may be determined for the sub-value of the color values. For example, bounding box 1610 may be determined as discussed herein. The bounding box may have any number of bounding ranges. In some examples, each color channel may be compressed using a bounding range. In other example, only one or some of the color channels may be compressed using bounding range(s) and other color channels may remain uncompressed.

Processing may continue from operation 2104 to operation 2106, "Quantize the Bounding Range(s) to generate Set(s) of Available Values", where the one or more bounding ranges may be quantized to generate one or more sets of available values. For example, bounding ranges 1620 and 1630 may be quantized to generate corresponding available values 1720 and 1730 as discussed herein. In some examples, prior to quantizing the one or more bounding ranges, one or more corresponding bit widths may be set, as discussed herein. In some examples, setting the bit widths may include attempting to meet a bit budget. In some examples, setting the bit widths may include an iterative process of removing bits from graphics data to meet a bit budget.

Processing may continue from operation 2106 to operation 2108, "Associate the Set(s) of Available Values with Set(s) of Index Values", where the one or more sets of available values may be associated with one or more sets of index values. For example, available values 1720 and 1730 may be associated with index values 1820 and 1830, as discussed herein. In some examples, the bit width, the number of available values and the number of index values may be the same for a color channel Processing may continue from operation 2108 to operation 2110, "Encode Sub-Values of Color Values by associating Sub-Values with Index Values", where the sub-values corresponding to the one or more color channels may be encoded by associating the sub-values with an encoded index value from the corresponding set of index values. For example, sub-values 1920 and 1930 may be encoded by associating sub-values 1920 and 1930 with index values 1820 and 1830 (respectively) to generate encoded index values 1928 and 1938.

Such association of sub-values 1920 and 1930 may include determining a closest available value 1925 and 1935 for each of the sub values 1920 and 1930 and determining an index value 1820 and 1830 associated with the closest available value 1925 and 1935, as discussed herein.

Processing may continue from operation 910 to operation 2112, "Store Graphics Data Including Encoded Index Values and Data Associated with Bounding Box", where graphics data including the encoded index values and data associated with the bounding box may be stored. For example, the graphics data may be stored in a memory. In some examples the graphics data may include graphics data 2000 (not illustrated, see, e.g., FIG. 20). As discussed, in some examples, the graphics data may be stored in compressed format only if it meets a bit budget. In such examples, the number of bits for the graphics data may be compared with the bit budget. If the number of bits for the graphics data is less than or equal to the bit budget, the graphics data may be stored. If the number of bits for the graphics data is greater than the bit budget, other graphics data including the plurality of color values associated with individual pixels of a tile of pixels may be stored.

As shown in FIG. 21, in some examples, operations 2102-2112 may be performed serially. However, as discussed herein, in general, the operations of FIG. 21 may be performed in another order and some operations may be skipped entirely. Further, as described, the operations of FIG. 21 may be utilized in an attempt to meet a bit budget. In some examples, further operations may be performed to meet the bit budget.

Figure 23:
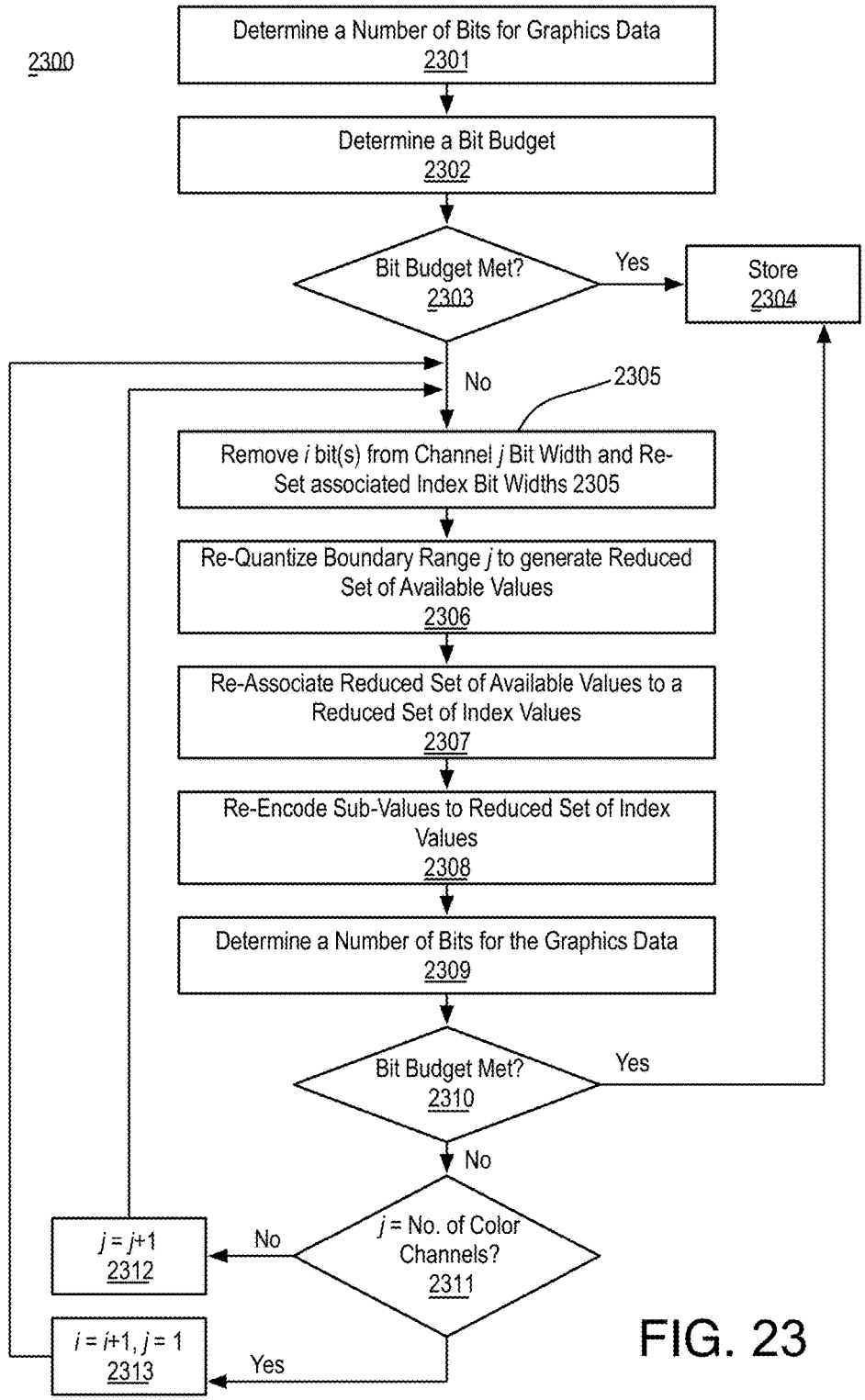
FIG. 23 is a flow chart illustrating an example process.

For example, FIG. 23 describes operations performed with respect to reducing graphics data to meet a desired bit budget. FIG. 23 is a flow chart illustrating an example process, arranged in accordance with at least some implementations of the present disclosure. In some examples, process 2300 may provide a computer-implemented method for providing compression in graphics rendering. In the illustrated implementation, process 2300 may include one or more operations, functions or actions as illustrated by one or more of operations 2301, 2302, 2303, 2304, 2305, 2306, 2307, 2308, 2309, 2310, 2311, 2312, and/or 2313. By way of non-limiting example, process 2300 will be described herein with reference to operations discussed with respect to FIGS. 13-22 and example system 100 discussed below.

Process 2300 may be utilized as a computer-implemented method for providing compression in graphics rendering. Process 2300 may begin at operations (not shown) to determine graphics data having encoded index values and data associated with a bounding box, as discussed herein. In some examples, the encoded index values may include a number of index encoded values that fully encodes or represents one or more bounding range(s) as discussed herein. In some examples, the encoded index values may include a number of index encoded values that are a maximum value or a starting value or the like. In some examples, the number of encoded index values may have been previously reduced using methods discussed herein. In some examples, process 2300 may provide a heuristic method for reducing or shaving bits from the graphics data such that more valuable data may be retained as the bit budget is attempted to be met.

Processing may continue at operation 2301, "Determine a Number of Bits for Graphics Data", where the number of bits for graphics data may be determined by analyzing the graphics data and counting the number of bits of the various components of the graphics data. The graphics data may include any suitable data as discussed herein such as the encoded index values and data representing a bounding box. The data representing a bounding box may include data associated with one or more bounding range(s) as discussed. For example, data associated with a bounding range may include a minimum value for the bounding range and a maximum value for the bounding range. The graphics data may further include one or more bit widths as discussed herein. Furthermore, the graphics data may include a clearmask enabled indicator bit and/or clearmask bits or other header data or the like.

Processing may continue from operation 2301 to operation 2302, "Determine a Bit Budget", where a bit budget may be determined. The bit budget may be any suitable number of bits. in some examples, the bit budget may be associated with a memory transaction or cache line size or the like. In some examples, the bit budget may be 512 bits or 1024 bits or the like. In some examples, the bit budget may be a fraction of the number of bits of a tile of pixels. For example, the bit budget may be a bit budget of 50% of the number of bits needed to encode tile 230 without compression, 75% of the number of bits needed to encode tile 110 without compression, or the like.

Processing may continue from operation 2302 to operation 2303, "Bit Budget Met?", where the number of bits for the graphics data may be compared with the bit budget. As shown, if the number of bits for the graphics data is less or equal to the bit budget (i.e., the bit budget is met), processing may continue at operation 2304, "Store", where the graphics data may be stored. For example, the graphic data may be stored in memory.

If the number of bits for the graphics data is more than the bit budget (i.e., the bit budget is not met), processing may continue at operations 2305-2309, where bits may be removed from the graphics data until the graphics data meets the bit budget (i.e., the number of bits for the graphics data is less or equal to the bit budget), which is tested at operation 2310. For example, removing the bits may be performed in an iterative process as is discussed further below. Although not shown in FIG. 23 for the sake of clarity of presentation, a minimum bit allowance may also be provided in process 2300. For example, the discussed iterative methods may remove bits only to a certain extent, such as for example, a minimum bit width for the color channels. In some examples, such minimum bit widths may provide for a minimum quality of color data. The minimum bit widths may be different for different channels depending on, for example, the importance of improved granularity for a color channel in a color space.

As discussed, processing may continue at operation 2305, "Remove i bit(s) from Channel j Bit Width and Re-Set associated Index Bit Widths" where a bit (e.g., i may begin at 1) may be removed from a bit width of channel j, which may be a first channel (e.g., j=1) for the removal of a bit. For example, a first bit may be removed from an individual channel's bit width (e.g., j=1), the bit budget may be tested (at operation 2310) and, if subsequent iterations are needed, a first bit may be removed for a second channel (e.g., j=2 at operation 2313), and so on until a first bit is removed for each channel (as determined at operation 2311). If the bit budget is still not met, a second bit may be removed (e.g., i=2) for channel (e.g., j=1) and so on until the bit budget is met or until the minimum thresholds are met (as discussed) and, if the bit budget still is not met, the compression may have deemed to have failed and the graphics data may be stored uncompressed.

As discussed, a first bit may be removed for an individual channel. In various examples, the color channels may be provided in an order for removal of a bit from the bit width of the channel. The channels may be provided in any suitable order. In some examples, the color values may include pseudo luminance/intensity orange chrominance green chrominance alpha (YCoCgA) color values and the order may be A, Cg, Co, Y. Furthermore, reducing the bit width for a channel may also re-set the associated bit width for index values as those values may be equal in the processes discussed herein.

Processing may continue from operation 2305 to operation 2306, "Re-Quantize Boundary Range j to generate Reduced Set of Available Values", where the boundary range associated with color channel j may be re-quantized based on the reduced bit width. For example, a bit width of 6 bits (corresponding to 64 available values, as discussed) may be reduced to a bit width of 5 bits (corresponding to 32 available values) for an A channel in a YCoCgA color space. In some examples, the re-quantize operation may operate as discussed herein with respect to quantizing a bounding range such as, for example, quantizing bounding ranges 1620 and 1630 and the like to produce a reduced set of available values (similar to available values 1720 and 1730, but with a greater granularity due to the reduced bit width).

Processing may continue from operation 2306 to operation 2307, "Re-Associate Reduced Set of Available Values to a Reduced Set of Index Values", where the reduced set of available values may be associated with a reduced set of index values. In some examples, the re-associate operation may be performed as discussed herein with respect to associating available values such as, for example, associating available values 1720 and 1730 with index values 1820 and 1830 (albeit with a reduced set of index values, as discussed).

Processing may continue from operation 2307 to operation 2308, "Re-Encode Sub-Values to Reduced Set of Index Values", where sub values for color channel j may be re-encoded by re-associating the sub-values with an encoded index value based on the reduced available values and reduced index values. In some examples, the re-encode operation may be performed as discussed with respect to the encode operation discussed herein.

Processing may continue from operation 2308 to operation 2309, "Determine a Number of Bits for Graphics Data", where the number of bits for graphics data may be determined by analyzing the graphics data and counting the number of bits of the various components of the graphics data as discussed herein. Processing may continue from operation 2309 to operation 2310, "Bit Budget Met?", where the number of bits for the (reduced) graphics data may be compared with the bit budget. As shown, if the number of bits for the graphics data is less or equal to the bit budget (i.e., the bit budget is met), processing may continue at operation 2304, "Store", where the graphics data may be stored. For example, the graphic data may be stored in memory.

If the number of bits for the graphics data is more than the bit budget (i.e., the bit budget is not met), processing may continue at operations 2311, "j=No. of Color Channels?", where it may be determined if j is equal to the number of color channels. If j is equal to the number of color channels, processing may continue at operation 2312, "j=j+1" where counter variable j may be increased by one and processing may continue at operation 2305 and a first bit (e.g., i=1) may be removed from the bit width of another color channel. If j is equal to the number of color channels, an equal number of bits (a first bit when i=1) may have been removed for each color channel and processing may continue at operation 2313, "i=i+1, j=1" where counter variable i may be increased by one and a second bit may be removed for the color channels (as needed) and j may be set to 1 so the order of color channels may begin again.

As shown, process 2300 may include a double nested loop such that a first bit is removed from the bit width from each color channel in an order. At each bit removal, the bit budget may be checked. If the bit budget is met, the graphics data may be stored. If the bit budget is not met after removal of a first bit from each channel, a second bit may likewise be removed from each channel in an order and so on until the bit budget is met (or minimum bit width thresholds are met as discussed). In such a manner, a bit budget may be met with the minimum amount of data loss. Furthermore, the value of the data lost may be further mitigated by taking care in choosing the order of the color channels.

As discussed, process 2300 may provide a heuristic method for reducing or shaving bits from the graphics data such that more valuable data may be retained as the bit budget is attempted to be met. In some examples, the following code may be used to reduce bits from graphics data as discussed herein:

```
1    static const int minWidth[4] = {4, 3, 3, 3};
2    int bitsReq = (width[Y] + width[Co] + width[Cg] + width[A]}*NUM_PIX;
3    while(bitsReq > bitBudget)
4    {
5        for (int ch = CHANNELS-1; ch >= 0; --ch)
6        {
7            if (bitsReq > bitBudget && width[ch] > minWidth[ch])
8            {
9                width[ch]--;
10               bitsReq -= NUM_PIX;
11           }
12       }
13   }
```

In some examples, process 2100 and/or process 2300 may provide for compression in graphics rendering as discussed herein. Process 2100 and/or process 2300 may be repeated any number of times either in serial or in parallel, as needed. Furthermore, in general, process 2100 and/or process 2300 may be implemented via hardware, software, firmware, or a combination thereof, as is discussed further herein. In some examples, process 2100 and/or process 2300 may be applied to "present" render targets (e.g., final render targets to be displayed to a user). In some implementations, it may be advantageous to limit the described techniques to such "present" render targets or a single implementation in a graphics pipeline because multiple implementations of the compression techniques may introduce errors that may grow relatively quickly. By limiting the number of implementations this type of tandem compression error may be limited. In some examples, the discussed techniques may be provided as an optional feature to either a user or a developer in various system implementations (e.g., the discussed techniques or portions thereof could be exposed as a switch available to a user or developer).

FIG. 24 is a flow chart illustrating an example process 2400, arranged in accordance with at least some implementations of the present disclosure. In some examples, process 2400 may provide a computer-implemented method for providing decompression in graphics rendering. In the illustrated implementation, process 2400 may include one or more operations, functions or actions as illustrated by one or more of operations 2402, 2404, 2406, and/or 2408. By way of non-limiting example, process 2400 will be described herein with reference to operations discussed with respect to FIGS. 13-23 above and example system 100 discussed below.

Process 2400 may be utilized as a computer-implemented method for providing decompression in graphics rendering. Process 2400 may begin at operation 2402, "Access Graphics Data" where graphics data may be accessed. For example, the graphics data may include encoded index values and data associated with a bounding box as described herein. For example, the graphics data may be accessed or read via memory. In some examples, the graphics data may include encoded index values 1928 and 1938 as discussed (not illustrated, see, e.g., FIG. 19). In some examples the graphics data may include graphics data 2000 (not illustrated, see, e.g., FIG. 20).

Processing may continue from operation 2402 to operation 2404, "Determine a Set of Available Values based on the Graphics Data", where available values may be determined based on the graphics data. For example, the data associated with the bounding box may include minimum and maximum values for bounding ranges and bit widths for the bounding ranges. Based on the minimum and maximum values and the bit width for a bounding range, the available values may be determined. For example, the bit width (k) may be used to determine the number of available values as 2 k (e.g., for a bit width of 3, the number of available values is 23=8). Furthermore, the minimum and maximum values may be available values and the available values between the minimum and maximum values may be determined by dividing the range equally. For example, the available values may be given as [(MAX-MIN)/(Available Values -2)}1*i+MIN, where i is a counter variable running from 2 to Available Values minus 1. For example, available values 1720, 1730 may be determined using such techniques.

Processing may continue from operation 2404 to operation 2406, "Determine Decoded Color Values for Pixels based on Encoded Index Values in the Graphics Data", where decoded color values may be determined for any number of pixels. For example, decoded color values 1935 and 1925 (described above as "closest available color values") may be determined by decoding encoded index values and associating pixels 1320 with decoded sub-values. In some examples, the decoded color values may be lossy with respect to the "actual" color values 1330 described above (not illustrated, see, e.g., FIG. 13). The decoding may be performed using any suitable technique or techniques. For example, the available values determined at operation 2404 may be associated with index values based on a predetermined method (such as the index values increasing as the available values increase) and each sub-value may be decoded based on the associated index value. In some examples, the decoding may be performed on data having a predetermined structure such as the structure discussed with respect to graphics data 2000 (not illustrated, see, e.g., FIG. 20).

Processing may continue from operation 2406 to operation 2408, "Map Decoded Color Values to another Color Space", where the decoded color values may be mapped to another color space. As discussed, in some examples, color values may be mapped to another color space to enhance compression. In such examples, the decompressed color values may be mapped to the previous color space In other examples, the color data may need to be mapped based on system requirements or compatibility or the like. In any event, the colors may be mapped based on known techniques. In some examples, decoded color values in the pseudo luminance/intensity orange chrominance green chrominance alpha (YCoCgA) color space may be mapped to color values in the red green blue alpha (RGBA) color space.

In some examples, process 2400 may provide for decompression in graphics rendering as discussed herein. Process 2400 may be repeated any number of times either in serial or in parallel, as needed. Furthermore, in general, process 2400 may be implemented via hardware, software, firmware, or a combination thereof, as is discussed further herein.

In some examples, the techniques discussed herein may provide for substantial data compression in a flexible compression format with maintained image quality. For example, in video compression, the resulting decompressed video show little to no temporal artifacts.

Some additional and/or alternative details related to process 2100, 2300 or 2400 may be illustrated in one or more examples of implementations discussed in greater detail below with regard to FIG. 25.

Figure 25:
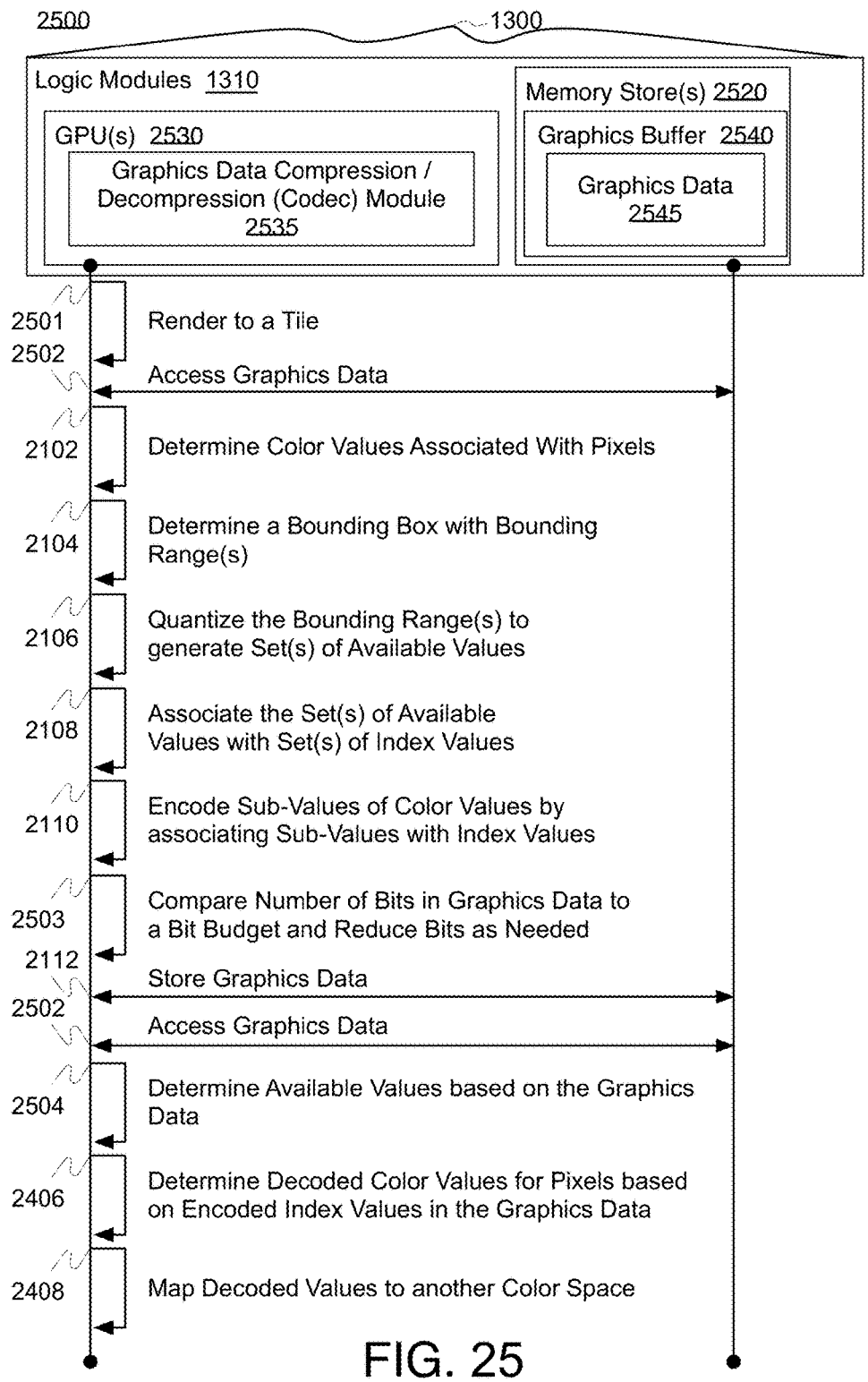
FIG. 25 is an illustrative diagram of example system and process for providing compression and/or decompression in graphics rendering.

FIG. 25 is an illustrative diagram of example system 100 and process 2500 for providing compression and/or decompression in graphics rendering, arranged in accordance with at least some implementations of the present disclosure. In the illustrated implementation, process 2500 may include one or more operations, functions or actions as illustrated by one or more of actions 2501, 2502, 2102, 2104, 2106, 2108, 2110, 2503, 2112, 2402, 2406, 2406,and/or 2408. By way of non-limiting example, process 2500 also will be described herein with reference to example video coding system 1300 of FIG. 26, as is described herein below.

In the illustrated implementation, system 1300 may include logic modules 1310, the like, and/or combinations thereof. For example, logic modules 1310, may include memory store(s) 2520, graphics processing unit(s) 2530, which may include graphics data compression / decompression ("codec") module 2535, and graphics buffer 2540, the like, and/or combinations thereof. In various examples, graphics data codec module 2535 may provide compression or decompression or both.

Graphics data codec module 2535, for example, may be configured to determine a plurality of color values associated with a plurality of pixels, wherein the plurality of color values comprise sub-values corresponding to a plurality of color channels, determine a bounding box for the sub-values, wherein the bounding box comprises one or more bounding ranges for one or more of the plurality of color channels, quantize the one or more bounding ranges to generate one or more sets of available values, associate the one or more sets of available values with one or more sets of index values, encode sub-values corresponding to one or more of the plurality of color channels by associating the sub-values with an encoded index value from the corresponding set of index values to generate encoded index values, and store, in graphics buffer 2540, graphics data 2545 including the encoded index values and data associated with the bounding box. Graphics data codec module 2535 may be further configured to remove bits from the graphics data until the graphics data is less than or equal to the bit budget, as discussed herein. In such a manner, graphics data codec module 2535 may provide compression for graphics data such as color values associated with pixels of a tile of pixels, for example.

Graphics data codec module 2535 (or another module of graphics processing unit(s) 2530 may be further configured to access graphics data 2545, determine, based on data associated with a bounding box and one or more bit widths in graphics data 2545, one or more sets of available values, determine, based on encoded index values in graphics data 2545, a plurality of decoded color values for the plurality of pixels such that the decoded color values are lossy with respect to the plurality of color values, and to optionally map the plurality of decoded color values from to another color space. In such a manner, graphics data codec module 2535 (or another module of graphics processing unit(s) 2530) may provide decompression for graphics data such as color values associated with pixels of a tile of pixels, for example. As discussed, in some examples, graphics data codec module 2535 may be configured to provide both compression and decompression. In other examples, compression and decompression may be provided by separate modules (e.g., compression module(s) and decompression module(s)).

Process 2500 may be utilized as a computer-implemented method for providing compression and/or decompression in graphics rendering. Process 2500 may begin at operation 2501, "Render to a Tile", where a tile of pixels may be rendered. The tile may be rendered using any suitable techniques and may generate a tile of pixels as discussed herein. The rendering may be based on any suitable data such as image data, model, models, or model data, scene data, vector data, raster data, or the like.

Processing may continue from operation 2501 to operation 2502, "Access Graphics Data", where graphics data codec module 2535 may access graphics data 2545 via graphics buffer 2540 of memory stores 2520. Graphics data 2545 may contain any data as discussed herein. In some examples, the graphics data may include uncompressed pixel color values such as, for example, color values 1330 (not illustrated, see, e.g., FIG. 13.

Processing may continue from operation 2502 to operation 2102, "Determine Color Values Associated With Pixels", where graphics data codec module 2535 may determine a plurality of color values associated with pixels (e.g., of a tile of pixels) as discussed herein. Processing may continue from operation 2102 to operation 2104, "Determine a Bounding Box with Bounding Range(s)", where graphics data codec module 2535 may determine a bounding box having one or more bounding ranges as discussed herein. Processing may continue from operation 2104 to operation 2106, "Quantize the Bounding Range(s) to generate Set(s) of Available Values", where graphics data codec module 2535 may quantize the one or more bounding ranges to generate one or more sets of available values as discussed herein. Processing may continue from operation 2106 to operation 2108, "Associate the Set(s) of Available Values with Set(s) of Index Values", where graphics data codec module 2535 may associate the one or more sets of available values with one or more sets of index values as discussed herein. Processing may continue from operation 2108 to operation 2110, "Encode Sub-Values of Color Values by associating Sub-Values with Index Values", where graphics data codec module 2535 may encode the sub-values corresponding to the one or more color channels by associating the sub-values with an encoded index value from the corresponding set of index values.

Processing may continue from operation 2110 to operation 2503, "Compare Number of Bits in Graphics Data to a Bit Budget and Reduce Bits as Needed", where graphics data codec module 2535 may compare the number of bits in the graphics data to a bit budget and reduce the number of bits as needed. For example, if the number of bits meets the bit budget, no bits may be removed. If the number of bits does not meet the bit budget, bits may be removed using the techniques discussed herein such as, for example, the techniques discussed with respect to process 2300 illustrated in FIG. 23. Processing may continue from operation 2503 to operation 2112, "Store Graphics Data Including Encoded Index Values and Data Associated with Bounding Box", where graphics data codec module 2535 may store graphics data 2545 including the encoded index values and data associated with the bounding box. In some examples, graphics data 2545 (after compression and storage) may include graphics data 2000 (not illustrated, see, e.g., FIG. 20) as discussed herein. As discussed, in some examples, graphics data 2545 may be transmitted from system to another system (not shown) either instead of or in addition to being stored at system 100.

In some examples, operations 2501, 2502, 2102, 2104, 2106, 2108, 2110, 2503, and/or 2112 may provide graphics data compression. Such compression may occur when storing graphics data into graphics buffer 2540, on a cache evict of graphics buffer 2540, or the like. As discussed, in some examples, the discussed compression techniques may be applied to "present" render targets (e.g., final render targets to be displayed to a user).

Processing may continue from operation 2112 to operation 2402 or, if previously compressed graphics data are provided (either via storage at system 100 or via being received by system 100), processing may begin at operation 2402, "Access Graphics Data", where graphics data codec module 2535 may access compressed graphics data 2545 via graphics buffer 2540 of memory stores 2520. For example, graphics data 2545 may include encoded index values and data associated with a bounding box as described herein. Processing may continue from operation 2402 to operation 2404, "Determine a Set of Available Values based on the Graphics Data", where graphics data codec module 2535 may determine available values based on graphics data 2545 as discussed herein. Processing may continue from operation 2404 to operation 2406, "Determine Decoded Color Values for Pixels based on Encoded Index Values in the Graphics Data", where graphics data codec module 2535 may determine decoded color values for any number of pixels based on graphics data 2545 as discussed herein. Processing may continue from operation 2406 to operation 2408, "Map Decoded Color Values to another Color Space", where graphics data codec module 2535 the decoded color values may be optionally mapped to another color space as discussed herein.

In some examples, operations 2402, 2404, 2406, and/or 2408 may provide graphics data decompression. Such decompression may occur when using or preparing to use graphics data 2545. For example, such decompressed graphics data may be used for rendering a tile, displaying an image, or the like. In some examples, graphics data 2545 may be received at system 100 or the like from another system (not shown) for decompression using the described techniques.

Process 2500 (or the processes described with respect to operations 2501, 2502, 2102, 2104, 2106, 2108, 2110, 2503, and/or 2112 or operations 2402, 2404, 2406, and/or 2408) may be repeated any number of times either in serial or in parallel, as needed. Furthermore, in general, graphics data codec module 2535 may be implemented via hardware, software, and/or firmware. As shown, in some implementations, graphics data codec module 2535 may be implemented via graphics processing unit(s) 2530. In other implementations, graphics data codec module 2535 may be implemented via software implemented via one or more central processing unit(s). In some examples, graphics data codec module 2535 and/or the operations discussed herein may be enabled or enabled at a system, user, or developer level, for example.

While implementation of example processes 2100, 2300, 2400, 2500 and other processes discussed herein may include the undertaking of all operations shown in the order illustrated, the present disclosure is not limited in this regard and, in various examples, implementation of the processes discussed herein may include the undertaking only a subset of the operations shown and/or in a different order than illustrated.

In addition, any one or more of the operations discussed herein (such as the operations illustrated and discussed with respect to FIGS. 13-25) may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the operations or operations discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 26:
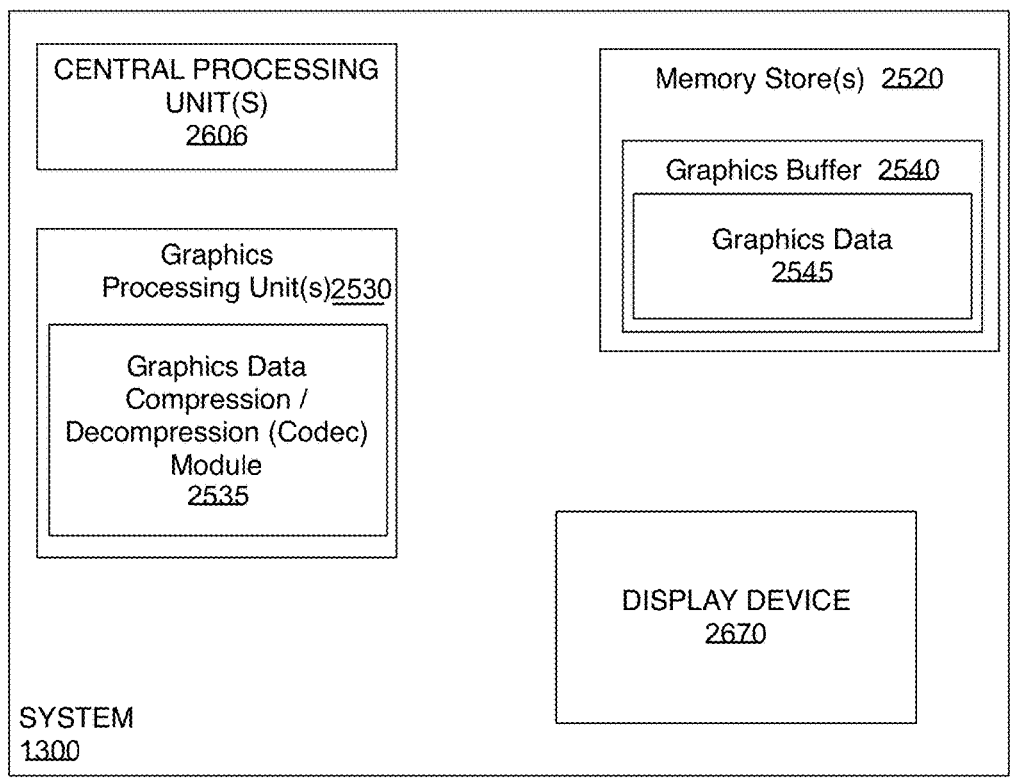
FIG. 26 is an illustrative diagram of an example system for compression and/or decompression providing graphics rendering.

FIG. 26 is an illustrative diagram of an example system 100 for providing compression and/or decompression in graphics rendering, arranged in accordance with at least some implementations of the present disclosure. In the illustrated implementation, system 100 may include one or more central processing units 2606, one or more memory stores 2520, one or more graphics processing units 2530, graphics buffer 2540 and/or a display device 2670. Central processing units 2606, memory store 2520, graphics processing units 2530, buffer 2540, and/or display device 2670 may be capable of communication with one another, via, for example, a bus or other access. In various implementations, display device 2670 may be integrated in system 100 or implemented separately from system 100.

As shown in FIG. 26, and discussed above, graphics data codec module 2535 may be implemented via graphics processing units 2530. In other example, graphics data codec module 2535 may be implemented via central processing units 2606. As shown, graphics processing unit 2530 may include graphics data codec module 2535. Graphics processing unit 2530 may be communicatively coupled to graphics buffer 2540. Graphics data codec module 2535 may be configured to determine a plurality of color values associated with a plurality of pixels, wherein the plurality of color values comprise sub-values corresponding to a plurality of color channels, determine a bounding box for the sub-values, wherein the bounding box comprises one or more bounding ranges for one or more of the plurality of color channels, quantize the one or more bounding ranges to generate one or more sets of available values, associate the one or more sets of available values with one or more sets of index values, encode sub-values corresponding to one or more of the plurality of color channels by associating the sub-values with an encoded index value from the corresponding set of index values to generate encoded index values, and store, in graphics buffer 2540, graphics data 2545 including the encoded index values and data associated with the bounding box. Memory stores 2520 may be communicatively coupled to graphics processing unit 2530. Memory stores 2520 may include graphics buffer 2540, which may be accessed by graphics data codec module 2535 to retrieve graphics data 2545. Furthermore, display device 2670 may be configured to display output image data (not shown) based at least in part on graphics data 2545. As discussed, graphics data codec module 2535 may be further configured to access and/or decompress graphics data 2545 as discussed herein.

As will be appreciated, the modules illustrated in FIG. 26 may include a variety of software and/or hardware modules and/or modules that may be implemented via software and/or hardware. For example, the modules may be implemented as software via central processing units 2606 and/or graphics processing units 2530 or the modules may be implemented via a dedicated hardware portion or portions of graphics processing units 2530. Furthermore, the shown memory stores 2520 may be shared memory for central processing units 2606 and/or graphics processing units 2520, for example. Furthermore, graphics buffer 2540 may be implemented via memory stores 2520 or separately from memory stores 2520 and/or graphics buffer 2540 may be implemented via a general buffer that may include other buffer portions such as a render buffer, or the like. Also, system 100 may be implemented in a variety of ways. For example, system 100 (excluding display device 2670) may be implemented as a single chip or device having a graphics processor, a quad-core central processing unit, on-board cache, and a memory controller input/output (I/O) module (not shown). In other examples, system 100 (again excluding display device 2670) may be implemented as a chipset.

Central processing units 2606 may include any suitable implementation including, for example, microprocessor(s), multicore processors, application specific integrated circuits, chip(s), chipsets, or the like. Furthermore, graphics processing units 2530 may include any suitable implementation including, for example, processor(s), multicore processors, application specific integrated circuits, programmable logic devices, graphics cards, integrated graphics, general purpose graphics processing unit(s), or the like. In addition, memory stores 2520 and/or graphics buffer 2540 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 2520 and/or graphics buffer 2540 may be implemented via cache memory. In various examples, system 100 may be implemented as a chipset or as a system on a chip.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional embodiments.

In one example, a computer-implemented method for providing compression in graphics rendering may include determining a plurality of color values associated with a plurality of pixels such that the plurality of color values comprise sub-values corresponding to a plurality of color channels, determining a bounding box for the sub-values such that the bounding box may include one or more bounding ranges for one or more of the plurality of color channels, quantizing the one or more bounding ranges to generate one or more sets of available values, associating the one or more sets of available values with one or more sets of index values, encoding the sub-values corresponding to one or more of the plurality of color channels by associating the sub-values with an encoded index value from a corresponding set of index values of the one or more index values to generate encoded index values, and storing, in memory, graphics data comprising the encoded index values and data associated with the bounding box.

In further examples of a computer-implemented method for providing compression in graphics rendering may include setting one or more bit widths corresponding to the one or more bounding ranges, the one or more bit widths including a number of bits for representing the corresponding one or more available values, setting one or more index bit widths for the one or more sets of index values to the one or more bit widths, determining a number of bits for the graphics data such that the graphic data may include data associated with the plurality of bounding ranges such that the data associated with the plurality of bounding ranges may include a minimum value and a maximum value for each of the plurality of bounding ranges, such that the graphics data may further include the one or more bit widths, and such that the graphics data may further include a clearmask enabled indicator bit and clearmask bits, determining a bit budget, comparing the number of bits for the graphics data with the bit budget, and, if the number of bits for the graphics data is less than or equal to the bit budget, storing, in memory, the graphics data, and, if the number of bits for the graphics data is greater than the bit budget, removing bits from the graphics data until the graphics data is less than or equal to the bit budget to generate reduced graphics data and subsequently storing in memory, the reduced graphics data such that removing bits from the graphics data comprises, iteratively, in an order of the plurality of color channels: reducing an individual one of the one or more bit widths by one or more bits, re-setting an individual one of the one or more index bit widths to the reduced one or more bit widths, re-quantizing an individual one the one or more boundary ranges to generate one or more reduced sets of available values, re-associating an individual one the one or more reduced sets of available values with one or more reduced sets of index values, re-encoding an individual set of the sub-values corresponding to the one or more of the plurality of color channels by re-associating each of the sub-values with a reduced encoded index value from the corresponding set of reduced index values to generate reduced encoded index values, re-determining a reduced number of bits for the reduced graphics data, re-comparing the reduced number of bits for the graphics data with the bit budget, and, if the reduced number of bits for the graphics data is less than or equal to the bit budget, storing, in memory, the reduced graphics data, and, if the number of bits for the reduced graphics data is greater than the bit budget, performing another iteration so long as the individual one of the one or more bit widths is greater than a minimum threshold bit width. The color values may include pseudo luminance/intensity orange chrominance green chrominance alpha (YCoCgA) color values and wherein the order may be A, Cg, Co, Y. The computer-implemented method for providing compression in graphics rendering may further include rendering the plurality of pixels, accessing the graphics data such that accessing the graphics data may include reading the graphics data from the memory, determining, based at least in part on the data associated with the bounding box and the one or more bit widths, the one or more sets of available values, determining, based at least in part on the encoded index values, a plurality of decoded color values for the plurality of pixels such that the decoded color values may be lossy with respect to the plurality of color values, and mapping the plurality of decoded color values from a third color space to a fourth color space. The third color space may include the pseudo luminance/intensity orange chrominance green chrominance alpha (YCoCgA) color space and the fourth color space may include the red green blue alpha (RGBA) color space. The plurality of color values may include at least one of red green blue alpha (RGBA) color values or pseudo luminance/intensity orange chrominance green chrominance alpha (YCoCgA) color values. The bounding box may include at least one of one bounding range, two bounding ranges, three bounding ranges, or four bounding ranges. Determining the plurality of color values may include mapping from a first color space to a second color space such that the second color space may be associated with the plurality of color channels, the first color space may include a red green blue alpha (RGBA) color space, and the second color space may include a pseudo luminance/intensity orange chrominance green chrominance alpha (YCoCgA) color space. The plurality of pixels may include a tile of pixels and the tile of pixels may include an 8 pixels wide by 4 pixels high tile of pixels. The bounding box may include a bounding range for each of the plurality of color channels. A first bit width of the one or more bit widths may be at least one of 0, 1, 2, 4, 8, 16, or 32 bits. A second bit width of the one or more bit widths may be 0 bits and, for a corresponding second color channel of the plurality of color channels, the encoded index values may include no data.

In another example, a system for compression in graphics rendering on a computer may include a graphics buffer and a graphics processing unit, and a display device. The graphics processing unit may include a graphics codec module. The graphics processing unit may be communicatively coupled to the graphics buffer and the graphics codec module may be configured to determine a plurality of color values associated with a plurality of pixels, wherein the plurality of color values comprise sub-values corresponding to a plurality of color channels, determine a bounding box for the sub-values, wherein the bounding box comprises one or more bounding ranges for one or more of the plurality of color channels, quantize the one or more bounding ranges to generate one or more sets of available values, associate the one or more sets of available values with one or more sets of index values, encode the sub-values corresponding to one or more of the plurality of color channels by associating the sub-values with an encoded index value from a corresponding set of index values of the one or more index values to generate encoded index values, and store in the graphics buffer, graphics data comprising the encoded index values and data associated with the bounding box.

In other examples of systems for providing compression in graphics rendering on a computer, the graphics codec module may be further include a display device. The display device may be configured to display output image data based at least in part on the graphics data. The graphics coded module may be further configured to set one or more bit widths corresponding to the one or more bounding ranges, the one or more bit widths including a number of bits for representing the corresponding one or more available values, set one or more index bit widths for the one or more sets of index values to the one or more bit widths, determine a number of bits for the graphics data such that the graphic data includes data associated with the plurality of bounding ranges, such that the data associated with the plurality of bounding ranges includes a minimum value and a maximum value for each of the plurality of bounding ranges, such that the graphics data further includes the one or more bit widths, and such that the graphics data further includes a clearmask enabled indicator bit and clearmask bits, determine a bit budget, compare the number of bits for the graphics data with the bit budget, and, if the number of bits for the graphics data is less than or equal to the bit budget, store, in graphics buffer, the graphics data, and, if the number of bits for the graphics data is greater than the bit budget, remove bits from the graphics data until the graphics data is less than or equal to the bit budget to generated reduced graphics data and subsequently store in the graphics buffer the reduced graphics data, wherein to remove bits from the graphics data the graphics data codec module is configured to, iteratively, in an order of the plurality of color channels: reduce an individual one of the one or more bit widths by one or more bits, re-set an individual one of the one or more index bit widths to the reduced one or more bit widths, re-quantize an individual one the one or more boundary ranges to generate one or more reduced sets of available values, re-associate an individual one the one or more reduced sets of available values with one or more reduced sets of index values, re-encode an individual set of the sub-values corresponding to the one or more of the plurality of color channels by re-associating each of the sub-values with a reduced encoded index value from the corresponding set of reduced index values to generate reduced encoded index values, re-determine a reduced number of bits for the reduced graphics data, re-compare the reduced number of bits for the graphics data with the bit budget, and, if the reduced number of bits for the graphics data is less than or equal to the bit budget, store, in the graphics buffer, the reduced graphics data, and, if the number of bits for the reduced graphics data is greater than the bit budget, perform another iteration so long as the individual one of the one or more bit widths is greater than a minimum threshold bit width, such that the color values may include pseudo luminance/intensity orange chrominance green chrominance alpha (YCoCgA) color values and the order may be A, Cg, Co, Y, render the plurality of pixels, access the graphics data such that accessing the graphics data includes reading the graphics data from the graphics buffer, determine, based at least in part on the data associated with the bounding box and the one or more bit widths, the one or more sets of available values, determine, based at least in part on the encoded index values, a plurality of decoded color values for the plurality of pixels such that the decoded color values are lossy with respect to the plurality of color values, and map the plurality of decoded color values from a third color space to a fourth color space, such that the third color space may include the pseudo luminance/intensity orange chrominance green chrominance alpha (YCoCgA) color space, and wherein the fourth color space may include the red green blue alpha (RGBA) color space. The plurality of color values may include at least one of red green blue alpha (RGBA) color values or pseudo luminance/intensity orange chrominance green chrominance alpha (YCoCgA) color values. The bounding box may include at least one of one bounding range, two bounding ranges, three bounding ranges, or four bounding ranges. Determining the plurality of color values may include mapping from a first color space to a second color space such that the second color space may be associated with the plurality of color channels, the first color space may include a red green blue alpha (RGBA) color space, and the second color space may include a pseudo luminance/intensity orange chrominance green chrominance alpha (YCoCgA) color space. The plurality of pixels may include a tile of pixels and the tile of pixels may include an 8 pixels wide by 4 pixels high tile of pixels. The bounding box may include a bounding range for each of the plurality of color channels. A first bit width of the one or more bit widths may be at least one of 0, 1, 2, 4, 8, 16, or 32 bits. A second bit width of the one or more bit widths may be 0 bits and, for a corresponding second color channel of the plurality of color channels, the encoded index values may include no data.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

Embodiments for Error-Bounded Lossy Color Buffer Compression

Some embodiments of the invention described below utilize lossy color buffer compression techniques which compress graphics data to 50% of its original size. This results in both additional bandwidth savings, compared to current lossless techniques, and also frees up memory by allowing the color buffer to be saved in half of the memory footprint. While a possible drawback is that repeated lossy encoding may introduce artifacts, so called tandem error accumulation, the quality is considerably higher than a high quality Blu-ray encoded movie. However, it is difficult to determine a theoretical upper bound for the error due to repeated compression.

The embodiments of the invention provide an extension to the lossy color buffer compression described above which only affect the encoder while leaving the decoder logic unmodified. With this novel modification of the encoder, an upper bound for the maximum error can be guaranteed. This is achieved by sacrificing some accuracy, which typically leads to a slightly larger average error. In one embodiment, both techniques are combined, re-using much of the hardware. The programmer may choose between the unbounded error compression mode, with lower average error, or the encoder with guaranteed maximum error.

The encoding described above encodes all pixels in a tile (i.e., a rectangular region of M×N color samples) using a small palette of available colors. In order to reduce storage, the palette is typically defined from a small set of parameters. For example, the palette can be computed as all evenly spaced colors between the maximum and minimum color in the tile, which means that only the max and min color must be stored in order to define the entire palette.

When compressing a pixel, the color in the palette that matches the pixel's color most closely is located, which is reasonable since it minimizes the average error. In one embodiment of the invention, the color space is arranged into pre-defined axis-aligned regions referred to as "buckets." In one embodiment, instead of picking the palette entry closest to the pixel color, the closest palette entry in the same bucket as the pixel color is selected. This ensures that the color of an encoded pixel will never move to another bucket, despite repeated compression. Consequently, the maximum error will be limited to the size of a bucket.

Example of Unbounded Maximum Error

Figure 27:
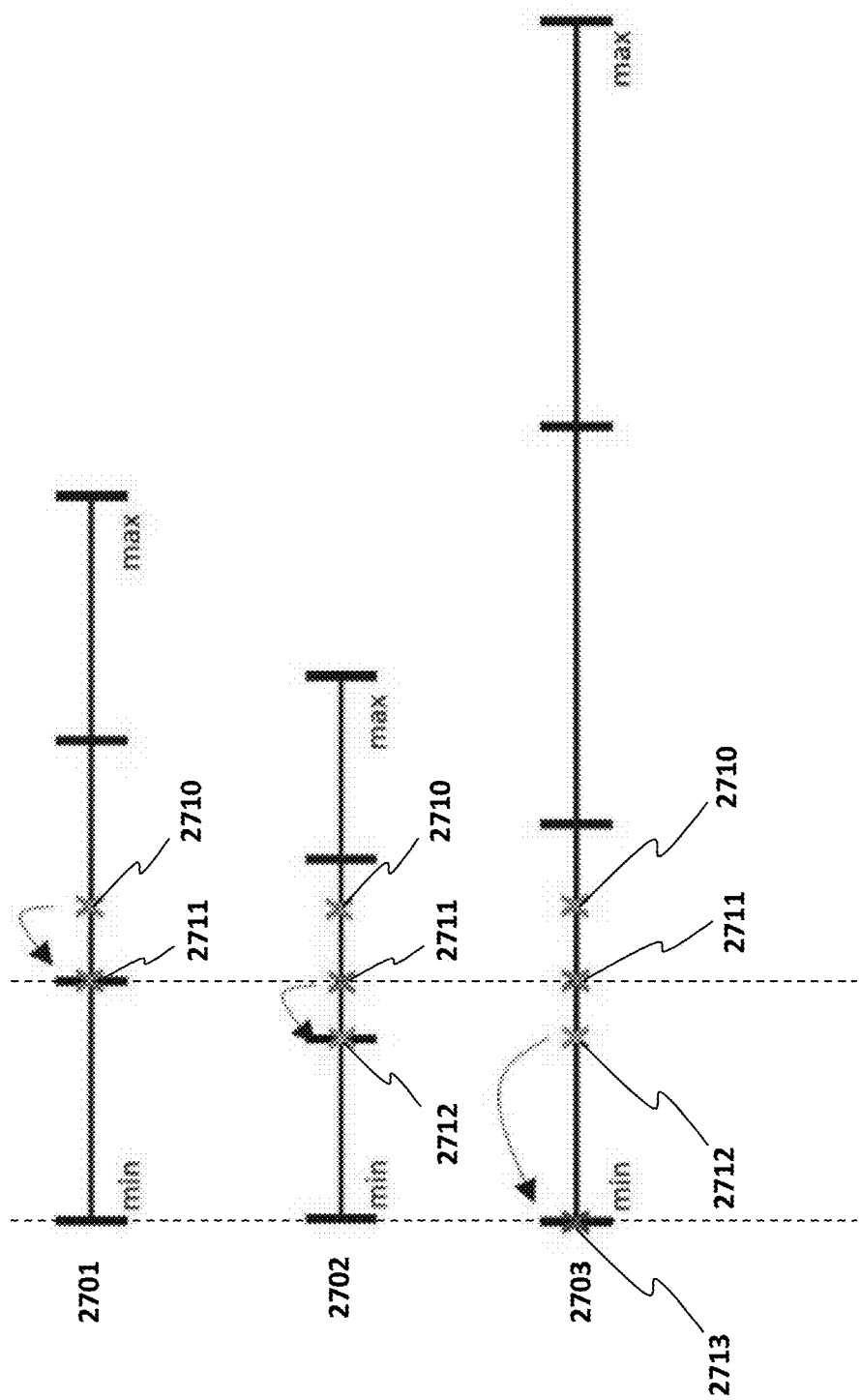
FIG. 27 illustrates an example of how a color may drift significantly after multiple compression iterations.

FIG. 27 illustrates an example of how the error in a single color channel can grow by a large amount when undergoing repeated compression. In particular, three compression operations 2701-2703 are shown. The value to be encoded, representing a single color channel from a given pixel, is indicated by the X 2710. In the first operation at 2701, it is quantized to the closest representable value, represented by X 2711.

Another part of the tile is then updated without overwriting the pixel. The tile is then recompressed at 2702, and because the min/max values change, the color channel value is re-encoded to a different quantized value, represented by X 2712.

When the tile is updated for a third time, the bounds change again and the color channel value is now re-quantized, identified by X 2713. Note that due to the three encoding steps 2701-2703, the original color channel value has drifted considerably from the original value. As a consequence, the corresponding pixel may change appearance completely.

Embodiments of the Invention

Without loss of generality, the discussion below will be constrained to the case of a single color component. As shown in the previous example of an unbounded error, picking the closest quantized value each time a color is compressed may cause an arbitrary drift from the original value. In one embodiment, the color space is divided into a pre-defined axis-aligned regions referred to as "buckets." The bucket size may be determined solely by the surface format and may therefore be fixed, irrespective of the current quantization. Instead of picking the palette entry closest to the pixel color, one embodiment of the invention selects the closest palette entry within the same bucket as the pixel color. FIG. 28A illustrates an exemplary movement of color values without buckets and FIG. 28B illustrates the same set of color values which have been constrained by bucket regions. In this example, buckets are identified by dotted lines and quantized values are identified by solid lines. The drift of pixel colors is limited by ensuring that a pixel is always encoded as a color from within the same bucket. Consequently, the difference between the original color and the encoded color is at most the size of the bucket, even if the tile is recompressed an arbitrary number of times.

Figure 29:
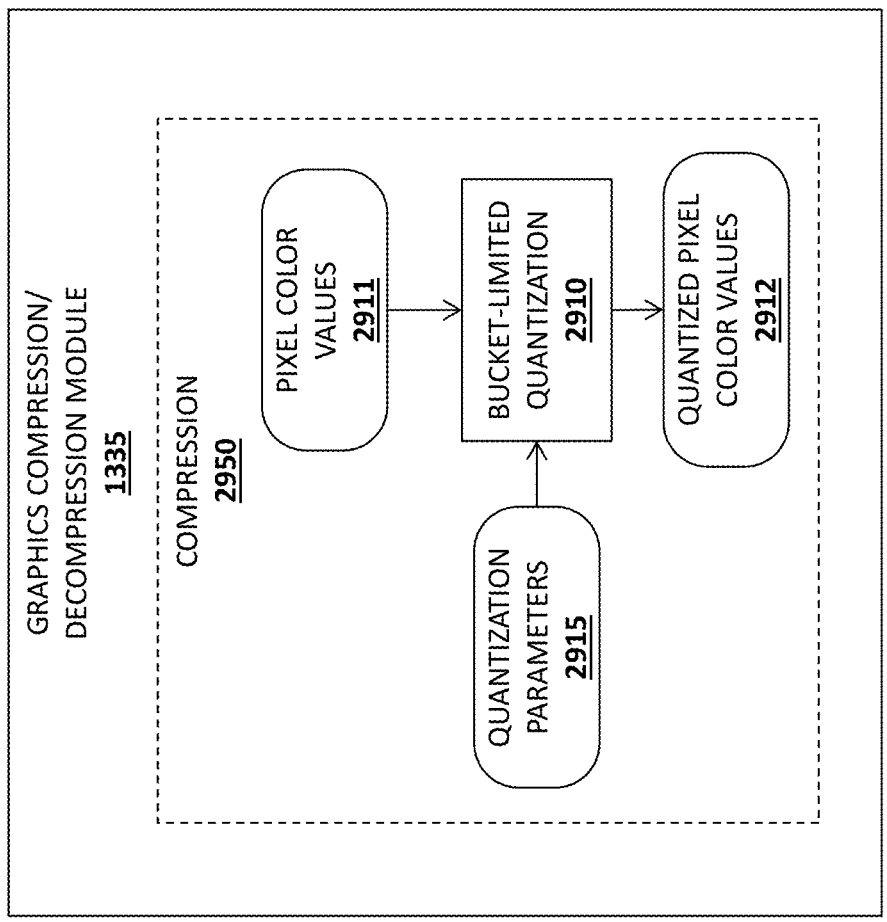
FIG. 29 illustrates a graphics compression/decompression module in accordance with one embodiment of the invention.

As illustrated in FIG. 29, in one embodiment of the invention, the encoder 2950 of the graphics compression/decompression module 1335 includes a bucket-limited quantization module 2910 which selects a bucket size based on quantization parameters 2915 and limits the movement of pixel values to a particular bucket in which the pixel is located. In particular, the bucket-limited quantization module 2910 receives pixel color values 2911 as input and generates quantized pixel color values 2912 in accordance with the bucket size.

In one embodiment, the bucket-limited quantization module sets the size of the buckets to the maximum distance between two quantized values that may occur when encoding an arbitrary tile. This distance may be computed using the compression techniques described above. For example, the above-described algorithm specifies that the quantization may never be reduced below n=(5,4,5) for the (Y,Co,Cg) components, respectively. In one embodiment, the maximum distance between two quantized values may never be greater than $2^{b-n}$ where b is the number of bits of an uncompressed color component. Consequently, the maximum distances in the above example are (8, 32, 16), which is also the bucket size. In Table 1 below, bucket sizes are enumerated for a few common color formats.

TABLE 1

| Color format | Worst case n (bits) | Bucket size |
|---|---|---|
| R8G8B8 | (5, 5, 4) | (8, 8, 16) |
| R8G8B8A8 | (3, 4, 3, 3) | (32, 16, 32, 32) |
| Y8Co9Cg9 | (5, 4, 5) | (8, 32, 16) |
| Y8Co9Cg9A8 | (4, 3, 3, 3) | (16, 64, 64, 32) |

Figure 30:
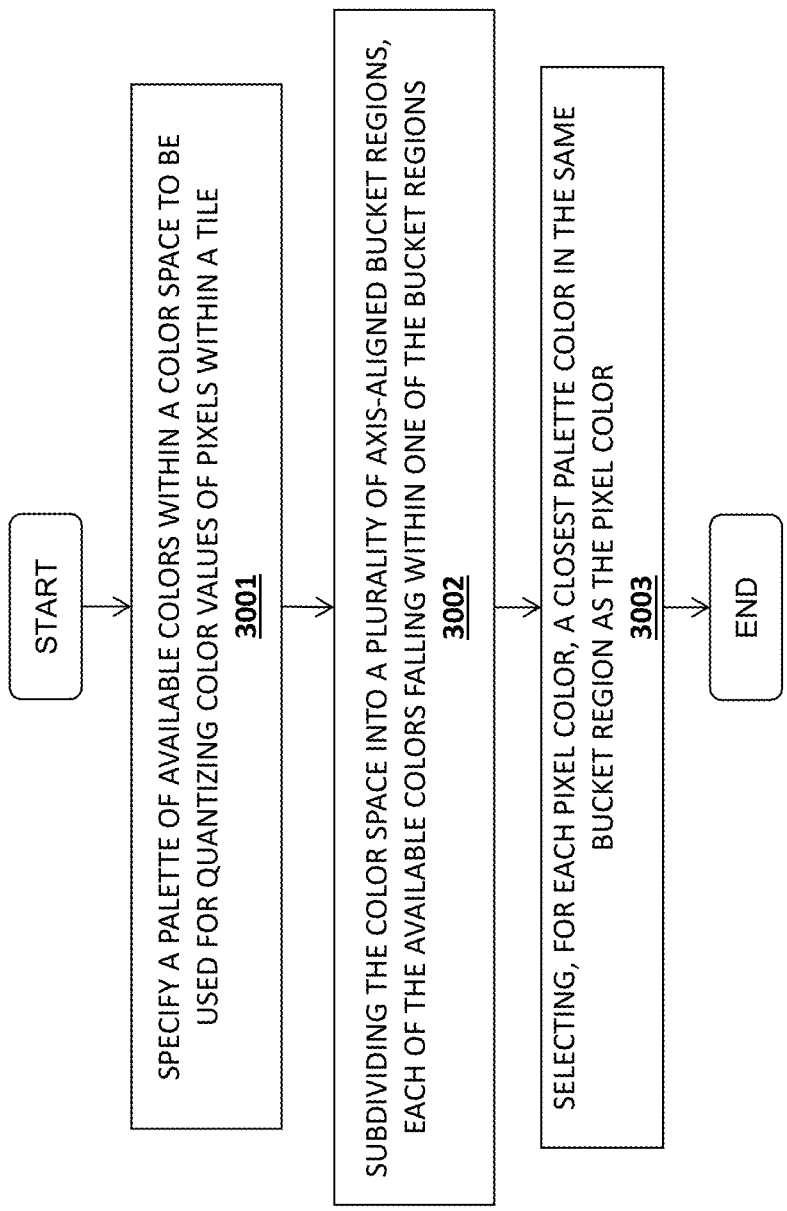
FIG. 30 illustrates a method in accordance with one embodiment of the invention.

A method in accordance with one embodiment of the invention is illustrated in FIG. 30. While the method may be implemented within the context of the system architectures described above, it is not limited to any particular system architecture.

At 3001, a palette of available colors is specified within a color space to be used for quantizing color values of pixels within a tile. At 3002, the color space is subdivided into a plurality of axis-aligned bucket regions, each of the available colors falling within one of the bucket regions. At 3003, the color values are quantized based on both the palette of available colors and the axis-aligned bucket regions. In particular, in one embodiment, for each pixel color, a closest palette color is selected in the same bucket region as the pixel color.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
specifying a palette of available colors within a color space to be used for quantizing color values of pixels within a tile of an image;
subdividing the color space into a plurality of axis-aligned bucket regions, each of the available colors falling within one of the bucket regions;
quantizing the color values based on both the palette of available colors and the axis-aligned bucket regions, wherein quantizing the color values comprises:
selecting, for a pixel color, a value for a palette color that is, within a same bucket region as the pixel color, the closet palette color to the pixel color as measured on an axis, wherein the pixel color is further, as measured on the axis, to the closest palette color in the same bucket region than to another palette color in another bucket region, and wherein the same bucket region and the another bucket region are within evenly spaced ranges of values in the axis; and
storing the quantized color values of the image in memory.

2. The method as in claim 1 wherein subdividing the color space comprises setting a size for the bucket regions based on a maximum distance between two quantized values that may occur when encoding an arbitrary tile.

3. The method as in claim 2 wherein the maximum distance between two quantized values is set to be less than $2^{b-n}$ where b is a number of bits of an uncompressed color component and n is a number of bits of a compressed color component.

4. The method as in claim 3 wherein different bit allocations are applied for each color channel.

5. The method as in claim 4 wherein different maximum distances are applied for each color channel.

6. The method as in claim 1 wherein each tile comprises a rectangular region of M×N color samples from an image to be rendered.

7. An apparatus comprising:
a graphics processor to execute a plurality of graphics commands to render a plurality of images;
a compression module of the graphics processor to compress color values of pixels within the images;
a bucket-limited quantization module integral to the compression module to specify a palette of available colors within a color space to be used for quantizing color values of pixels within a tile, subdivide the color space into a plurality of axis-aligned bucket regions, each of the available colors falling within one of the bucket regions, and quantize the color values based on both the palette of available colors and the axis-aligned bucket regions, wherein quantizing the color values comprises selecting, for a pixel color, a value for a palette color that is, within a same bucket region as the pixel color, the palette color to the pixel color as measured on an axis, wherein the pixel color is further, as measured on the axis, to the closest palette color in the same bucket region than to another palette color in another bucket region, and wherein the same bucket region and the another bucket region are within evenly spaced ranges of values in the axis; and
memory to store the quantized color values of the images.

8. The apparatus as in claim 7 wherein subdividing the color space comprises setting a size for the bucket regions based on a maximum distance between two quantized values that may occur when encoding an arbitrary tile.

9. The apparatus as in claim 8 wherein the maximum distance between two quantized values is set to be less than $2^{b-n}$ where b is a number of bits of an uncompressed color component and n is a number of bits of a compressed color component.

10. The apparatus as in claim 9 wherein different bit allocations are applied for each color channel.

11. The apparatus as in claim 10 wherein different maximum distances are applied for each color channel.

12. The apparatus as in claim 7 wherein each tile comprises a rectangular region of M×N color samples from an image to be rendered.

13. A system comprising:
a memory to store program code and data;
a central processing unit (CPU) comprising an instruction cache for caching a portion of the program code and a data cache for caching a portion of the data, the CPU further comprising execution logic to execute at least some of the program code and responsively process at least some of the data, at least a portion of the program code comprising graphics commands;
a graphics processing subsystem to process the graphics commands and responsively render a plurality of images, the graphics processing subsystem comprising:
a graphics processor to execute a plurality of graphics commands to render a plurality of images;

a compression module of the graphics processor to compress color values of pixels within the images; and a bucket-limited quantization module integral to the compression module to specify a palette of available colors within a color space to be used for quantizing color values of pixels within a tile, subdivide the color space into a plurality of axis-aligned bucket regions, each of the available colors falling within one of the bucket regions, and quantize the color values based on both the palette of available colors and the axis-aligned bucket regions, wherein quantizing the color values comprises selecting, for a pixel color, a value for a palette color that is, within a same bucket region as the pixel color, the palette color to the pixel color as measured on an axis, wherein the pixel color is further, as measured on the axis, to the closest palette color in the same bucket region than to another palette color in another bucket region, wherein the same bucket region and the another bucket region are within evenly spaced ranges of values in the axis, and wherein the quantized color values of the images are to be stored in the memory.

14. The system as in claim 13 wherein subdividing the color space comprises setting a size for the bucket regions based on a maximum distance between two quantized values that may occur when encoding an arbitrary tile.

15. The system as in claim 14 wherein the maximum distance between two quantized values is set to be less than $2^{b-n}$ where b is a number of bits of an uncompressed color component and n is a number of bits of a compressed color component.

16. The system as in claim 15 wherein different bit allocations are applied for each color channel.

17. The system as in claim 16 wherein different maximum distances are applied for each color channel.

18. The system as in claim 13 wherein each tile comprises a rectangular region of M×N color samples from an image to be rendered.

* * * * *